United States Patent
Morii et al.

(10) Patent No.: US 7,010,248 B2
(45) Date of Patent: Mar. 7, 2006

(54) TONER RECYCLING METHOD AND TONER RECYCLING SYSTEM

(75) Inventors: Yoshihiro Morii, Kanagawa (JP); Satosu Souma, Kanagawa (JP); Hiroyuki Kishi, Shizuoka (JP); Kazuma Torii, Shizuoka (JP); Hiroyuki Matsuura, Shizuoka (JP)

(73) Assignees: Ricoh Company, Limited, Tokyo (JP); Shinko Frex Inc., Hamamatsu (JP)

( * ) Notice: Subject to any disclaimer, the term of this patent is extended or adjusted under 35 U.S.C. 154(b) by 212 days.

(21) Appl. No.: 10/461,422

(22) Filed: Jun. 16, 2003

(65) Prior Publication Data

US 2004/0005167 A1 Jan. 8, 2004

(30) Foreign Application Priority Data

Jul. 4, 2002 (JP) .................................. 2002-196487

(51) Int. Cl.
*G03G 15/08* (2006.01)

(52) U.S. Cl. .................. 399/252; 241/24.1; 241/24.18; 264/911; 264/918

(58) Field of Classification Search ............ 399/27–30, 399/252; 241/24.1, 24.18, 24.28; 264/37.29, 264/349, 911, 915, 918; 700/115, 116, 145; 705/1, 28, 29
See application file for complete search history.

(56) References Cited

U.S. PATENT DOCUMENTS

| | | | |
|---|---|---|---|
| 5,339,138 A | 8/1994 | Mishima et al. | |
| 5,670,284 A | 9/1997 | Kishi et al. | |
| 5,960,402 A | * 9/1999 | Embutsu et al. | ................ 705/1 |
| 6,000,784 A | 12/1999 | Takemoto et al. | |
| 6,029,851 A | * 2/2000 | Jenkins et al. | .............. 221/102 |
| 6,113,681 A | 9/2000 | Tripathi et al. | |

(Continued)

FOREIGN PATENT DOCUMENTS

| | | | |
|---|---|---|---|
| EP | 1424144 A1 | * | 6/2004 |
| JP | 6-35621 | | 5/1994 |
| JP | 6-200332 | | 7/1994 |
| JP | 2732898 | | 3/1998 |
| JP | 2000-181958 | | 6/2000 |
| JP | 2001-3063 | | 1/2001 |

OTHER PUBLICATIONS

Patent Abstracts of Japan, JP 2002-069538, Mar. 8, 2002.
Patent Abstracts of Japan, JP 2000-070900, Mar. 7, 2000.
Derwent Publications, XP-002262015, JP 2003-138320, May 14, 2003.

(Continued)

*Primary Examiner*—Robert Beatty
(74) *Attorney, Agent, or Firm*—Oblon, Spivak, McClelland, Maier & Neustadt, P.C.

(57) ABSTRACT

A toner recycling method and a toner recycling system use two personal computers and a display. A personal computer carries out management of information of toner, which is collected at a toner collection site. Another personal computer generates recycling information, which includes information about toner requirement of a granule manufacturer. A display at the toner collection site displays recycling information. Collected toner is used for manufacturing flux by mixing with aluminum dross, aluminum ash, aluminum dregs etc.

141 Claims, 13 Drawing Sheets

U.S. PATENT DOCUMENTS

| | | | | |
|---|---|---|---|---|
| 6,217,684 B1 | | 4/2001 | Morii et al. | |
| 6,224,709 B1 | | 5/2001 | Takemoto et al. | |
| 6,311,904 B1 | * | 11/2001 | Leturmy et al. | 241/18 |
| 6,435,241 B1 | | 8/2002 | Morii et al. | |
| 6,471,801 B1 | | 10/2002 | Takemoto et al. | |
| 6,472,247 B1 | | 10/2002 | Andoh et al. | |
| 6,503,358 B1 | | 1/2003 | Takemoto et al. | |
| 6,529,788 B1 | * | 3/2003 | Tani et al. | 700/97 |
| 6,540,798 B1 | * | 4/2003 | Asanuma et al. | 44/628 |
| 6,544,376 B1 | | 4/2003 | Takemoto et al. | |
| 6,568,612 B1 | * | 5/2003 | Aoki et al. | 241/19 |
| 6,574,054 B1 | | 6/2003 | Hirai et al. | |
| 6,575,221 B1 | | 6/2003 | Morii et al. | |
| 6,610,396 B1 | * | 8/2003 | Kimura et al. | 428/323 |
| 6,718,343 B1 | * | 4/2004 | Kamata | 707/104.1 |

OTHER PUBLICATIONS

Patent Abstracts of Japan, JP 2003-147446, May 21, 2003.
Patent Abstracts of Japan, JP 6-266158, Sep. 22, 1994.
Patent Abstracts of Japan, JP 2000-328144, Nov. 28, 2000.
Derwent Publications, XP-002262016, KR 9 402 621, Mar. 26, 1994.
Patent Abstracts of Japan, JP 11-021612, Jan. 26, 1999.
U.S. Appl. No. 09/777,847, filed Feb. 7, 2001, Takemoto et al.
U.S. Appl. No. 09/888,600, filed Jun. 26, 2001, Andoh et al.
U.S. Appl. No. 10/077,937, filed Feb. 20, 2002, Morii et al.
U.S. Appl. No. 10/143,979, filed May 14, 2002, Morii et al.
U.S. Appl. No. 10/195,105, filed Jul. 15, 2002, Morii.
U.S. Appl. No. 10/461,422, filed Jun. 16, 2003, Morii et al.
U.S. Appl. No. 10/461,422, filed Jun. 16, 2003, Morii et al.
U.S. Appl. No. 10/795,394, filed Mar. 9, 2004, Morii et al.

* cited by examiner

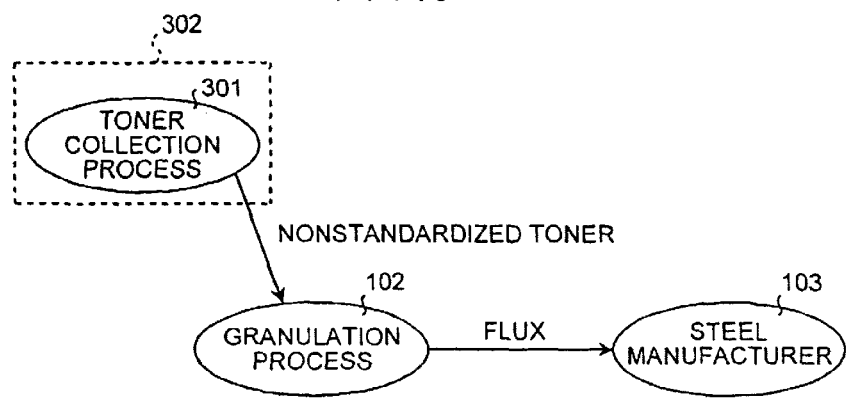
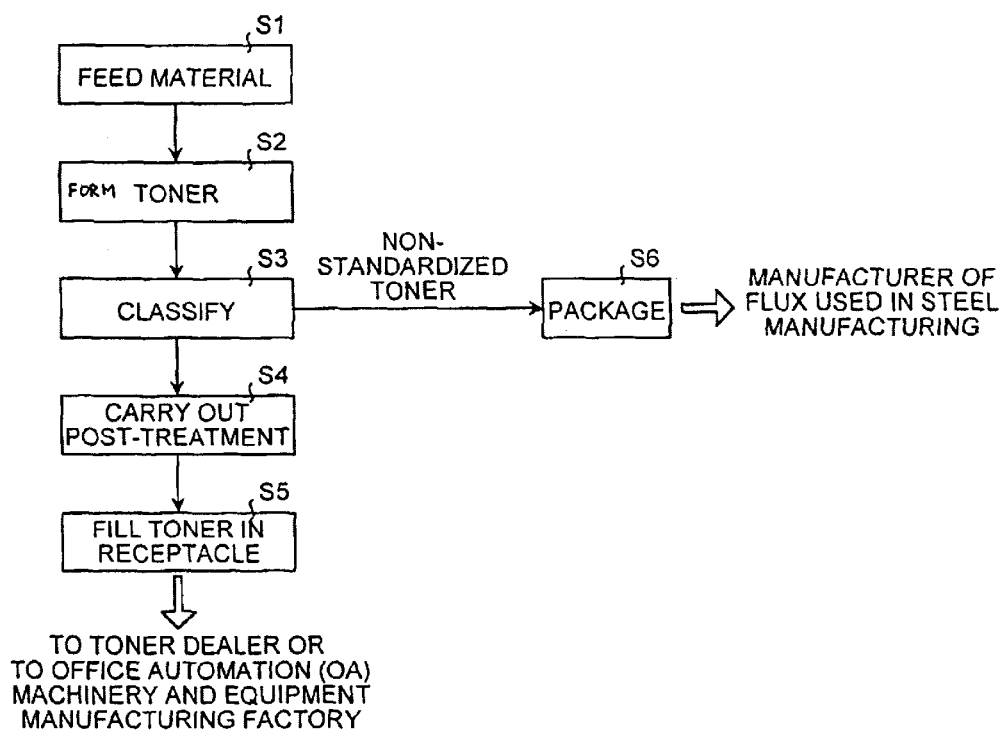

FIG.8A

| | JANUARY 2004 | FEBRUARY 2004 | |
|---|---|---|---|
| QUANTITY OF FLUX PURCHASED | DEOXIDIZING AGENT - TONS ⋮ | | |

| PRODUCT CODE | JANUARY 2004 | | |
|---|---|---|---|
| QUANTITY OF TONER PURCHASED | Y: ○ TONS<br>M: ○ TONS<br>C: ○ TONS<br>B: ○ TONS | | |
| Lot.No. | ○○○○ | △△△△ | |

| PRODUCT CODE | JANUARY 2004 | | |
|---|---|---|---|
| QUANTITY OF TONER PURCHASED | Y: ○ TONS<br>M: ○ TONS<br>C: ○ TONS<br>B: ○ TONS | | |
| Lot.No. | ○○○○ | △△△△ | |
| | DATA OF QUANTITY<br>DATA OF STORAGE PLACES ⋮ | ⋮ | ⋮ |

703

| INPUT (QUANTITY COLLECTED) | OUTPUT | |
|---|---|---|
| | MEANS | QUANTITY |
| ~TONS/MONTH | GRANULE MANUFACTURER | ~TONS/MONTH |
| | IRON WORKS | ~TONS/MONTH |
| | ⋮ | ⋮ |

○○○○(MONTH) ○○○○(YEAR)
RECYCLING RATE: ~%
MATERIAL RECYCLING RATIO:~ %
ENERGY RECOVERY RATIO:~ %

TONER RECYCLING METHOD AND TONER RECYCLING SYSTEM

BACKGROUND OF THE INVENTION

1) Field of the Invention

The present invention relates to a method of and a system for recycling toner easily and effectively.

2) Description of the Related Art

There has been an increasing awareness about the importance of environmental problems in today's world than it was before. Now a day, companies are assessed based on their contribution to environmental protection. Therefore, it has become vital for companies to carry out activities that lead to environmental protection. These activities include establishing recycling systems by which products, parts and materials can be recycled and reused in order to reduce waste and to make effective use of resources.

The recycling processes can be broadly divided into following six types:

1. Reuse by the User

A user of a product carries out the recycling by reusing the entire or a part of the product. If we consider an example of a copier, when a user himself refills a toner receptacle (toner bottle) and reuses the toner receptacle. In such case, there is no decrease in the value of object, the toner bottle, to be recycled. The advantages of this recycling process are that the burden on the environment is reduced to maximum extent and moreover, the processing cost is minimum.

2. Reuse of the Entire Product

A product already used is recovered from market (hereinafter, "recovered machine"). A prescribed recycling treatment is carried out on this recovered product to reuse as a recycled machine. This recycling process allows the major part of the product to be reused as it was used before. The advantage of this recycling method is that the burden on the environment is reduced to a great extent.

3. Reuse of the Parts

The parts and units removed from the recovered machine are reused as new parts and units. Since the parts and units that can be recycled need not be manufactured again, the advantage of this recycling method is that the burden on the environment is reduced to a large extent.

4. Recycling of Materials

Recycling of materials is a recycling process in which a recovered machine is disassembled in units of materials and the raw material obtained is classified, processed, and reused. This recycling process involves recycling of a closed loop material and an open loop material. The closed loop material is a material which can be reused in only the same field as the original product. On the other hand, the open loop material is a material which can be reused even in a different field.

5. Retransformation into Raw Material

In this recycling process, recovered machine is disassembled, classified and then transformed into a raw material for reuse. The retransformation into raw material can realize zero waste.

6. Energy Recovery

Energy recovery is a recycling process of using an energy generated by processing the recovered objects. An example of energy recovery is burning of recovered plastic and using the generated heat energy.

The six recycling processes are mentioned in a desirable order. In other words, the most desirable recycling process in general is the reuse by the user. The recycling process desirable next is the reuse of the entire product and still next is the reuse of the parts. It is important for companies to continue recycling by means mentioned in the order above while considering the economic aspect in order to promote the recycling.

However, products go on becoming outdated (old) in the market. A time comes for a product when it is no more useful to the market (user) and recycling of a product is not worth economically. Therefore, in reality, it is impossible to recycle a recovered machine semi permanently just by the reuse by the user. In other words, the user cannot recycle an outdated product. Furthermore, depending on the degree of outdating of the product, a desired order of the recycling processes may be different, or even may be reverse from the order mentioned above. For this reason, the companies have to carry out a plurality of recycling processes instead of carrying out only specified ones.

Further, a recycling process differs depending on the product itself. Again, for a recovered machine of one type, a recycling process differs depending on parts and units in a recovered machine. Therefore, it is necessary to carry out a plurality of recycling processes almost at the same time in order to promote recycling.

Japanese Patent Application Laid Open Publication No. 2000-181958 teaches a recycling system that can carry of the recycling processes efficiently. FIG. 15 illustrates the recycling system published in the Japanese Patent Application Laid Open Publication No. 2000-181958. This recycling system has a plurality of stages indicated by reference numerals from (1) to (20). Stage (1) is a manufacturing stage of a raw material. A raw material supplier, in general, manufactures the raw material. Stage (2) is a stage of material manufacturing using a new raw material or a recycled raw material. In general, a material manufacturer manufactures and supplies raw materials.

Stage (3) is a stage of manufacturing parts using new parts or recycled parts. In general, a parts manufacturer manufactures and supplies parts. Stage (4) is a stage of assembling products using new parts or recycled parts. In general, a product manufacturer assembles and supplies products. Stage (4) is a stage of selling of a product in which new parts or recycled parts are used. In general, dealer sells products.

Stage (6) is a stage of use and maintenance of product. In general, user (market) uses a product. Stage (7) is a stage of reuse by user. Stage (8) is a stage of product recovery and selection. In general, products are recovered from users (market) and brought to a prescribed recovery center where the products are sorted for the next stage.

Stage (9) is a stage of recycling of a product. In general, the recovery center sends,recovered products to a prescribed recycling center for recycling. Stage (10) is a stage of carrying out dismantling and classification of products. In general, the recovery center sends products to a prescribed recycling center for recycling. Stage (11) is a stage of recycling of parts. In general, the recycling center sends products to a prescribed parts recycling center for recycling of parts. Stage (12) is a stage of supplying the recycled parts to a manufacturer of products of other field. Stage (12) corresponds to the open recycling.

Stage (13) is a stage of breaking of parts (or products) into pieces. Parts made of a single material and parts made of a plurality of materials are crushed and classified in this stage. In general, recycling center (in some cases recovery center) sends parts (products) to prescribed shredding contractor for breaking and classification. Stage (14) is a stage of recycling of materials. Crushed material that can be recycled is sent from the previous stage (13) to a material recycling contractor for recycling. Further, the recycled material that is sent to the part manufacturer (stage (3)) is suitable for closed loop material recycling process and the recycled material that is sent to the user of recycled material (stage (15)) is suitable for open loop material recycling process which is mentioned later.

Stage (15) is a stage of using recycled material. The recycled material in stage (14) is sent to a user of recycled material. Stage (16) is a stage of transformation into a raw material in which metal raw material is removed from printed circuit boards and shredding dust. Stage (17) is a stage of transformation into a raw material in which transformation is carried out by removing oil from the shredding dust, heating and chemical decomposition. Stage (18) is a stage of using the recycled raw material in which the raw materials recycled in previous stages (16) and (17) is sent to a recycling contractor for use. Stage (19) is a stage of recovering heat energy. A heat energy recovery contractor recovers heat energy by burning the shredding dust. Stage (20) is a stage of final waste. In general, a contractor in a final stage uses the waste for reclamation by filling in the ground.

This recycling system is mainly used for recycling office automation equipment such as image forming apparatus. This recycling system can also be applied to home electric appliances, cars etc.

However, the recycling system disclosed so far does not give any financial profit to the companies. On the contrary, the recycling puts excess financial burden on companies. Therefore, it was disadvantageous for companies to continue the recycling for a long period, and therefore, it was difficult to contribute to the conservation of environment.

For example, Japanese Patent Application Laid Open Publication No. 2001-30363 disclosed to mix a waste toner with a sintering material and sinter the mixture. In this case, the iron powder in the toner can be used as an iron source, a part of resins is burned and can be used as a substitute of coke breeze. This type of invention can achieve both objects viz. disposal of waste toner and use of iron powder and resin content. However, some toners include iron powder and some do not. Even in the toners that include an iron powder, the iron powder content is as low as about 50%. Therefore, the added value in financial terms of iron content in toner for iron manufacturer is low.

Apart from that, only a small part of the resin content in a toner can be used as a substitute of coke breeze and a majority of part of the resin content is transformed into gas and disposed as waste gas in waste gas disposal (treatment) equipment in the process of steel manufacturing. Furthermore, the resin content of a toner differs according to the type of a toner. Therefore, the sintering process devised to accommodate the variation in the type of toner affects the reduction of sintered steel. In order to minimize this effect on the reduction of sintered steel, the proportion of waste toner in the sintering process is controlled to 0.5%.

Thus, from the point of view of the toner processors, the use of waste toner does not added much value in financial terms. Hence, the providers of the toner, like the toner manufacturers, pay the toner disposers to get the toner disposed. The toner providers have to bear the recycling cost. For this reason, toner providers are not motivated to take positive attitude toward recycling the toner continuously.

However, in the field of metal refining like steel making or aluminum refining, the generation of the powder particles can not be avoided during the refining and dissolution processes that are carried out for achieving metal from ore.

The powder particles include aluminum dross, aluminum ash, and aluminum dregs. Various proposals are made for recycling of these powder particles.

Using powder particles in a raw material of flux used in steel manufacturing (hereinafter, "flux") is a technique of recycling the powder particles. The flux is an additive used for the purpose of improving the fluidity of the slag and reduction of iron oxide that exists in the slag of an electric furnace and a blast furnace. The flux is formed in a particular size, taking into consideration the handling and the working environment. Formation of a particular size using powder particles is called granulation.

It is known to mix a binder during the granulation to improve granularity, automorphic characteristics, and crushing strength. Japanese Patent Application Laid Open Publication No. 1992-200332 and Japanese Patent Publication (KOUKOKU) No. 1992-35621 disclose binders like polybasic acids such as dimeric acid and trimeric acid, pitch, tar, starch, carboxyl methyl cellulose, polyvinyl alcohol, and inorganic element based binders like cement and bentonite.

However, there is a need to add water when inorganic element based materials, polyvinyl alcohol, and carboxyl methylcellulose are used as binders. Starch has high absorbency and poor water resisting property due to which it reacts with water in aluminum dregs and generates hydrogen and ammonia gases. When a flux that has tar or pitch as a binder in it, is put into a blast furnace, a large quantity of black smoke is generated thereby worsening the working environment. Use of dimeric acid and trimeric acid as a binder in the flux results in affecting the automorphic characteristics of granulation, low recovery of flakes after granulation, and high proportion with respect to the powder particles thereby lowering the metal refining density. Moreover, use in the aluminum dregs starts a chemical reaction from the time of granulation thereby oxidizing aluminum. Therefore, the flux loses the product value by losing the reduction capacity.

Japanese Patent No. 2732898 also proposes phenol based resins and polyurethane based resins as resin binders. However, the phenol-based resins have poor formation characteristics and polyurethane resins are expensive which increase the cost of the flux.

Thus, in the present situation there is no recycling method available for recycling toner with positive attitude on long-term basis (continuously). There is no suitable binder available for flux manufacturers, which can suits the flux.

SUMMARY OF THE INVENTION

The object of the present invention is to solve at least the problems in the conventional technology.

The toner recycling method according to one aspect of the present invention comprises a toner collection process of collecting a toner; a granulation process of manufacturing granules from the toner; a requirement information acquiring process of acquiring information about requirement of the granules from a prospective purchaser of the granules; a recycling information generation process of generating recycling information about a toner required for manufacturing of the granules by the purchaser and sending the recycling information, wherein the recycling information is generated based on the information about requirement of the granules, the recycling information is generated by using a computer, and the recycling information is sent via a network; and a toner information management process of receiving the recycling information and managing information about the toner collected based on the recycling information, by using a computer.

The toner recycling method according to another aspect of the present invention comprises a granulation process of manufacturing granules using a toner; a requirement information acquiring process of acquiring information about requirement of the granules from a prospective purchaser of the granules; and a recycling information generation process of generating recycling information about a toner required for manufacturing of the granules by the purchaser and sending the recycling information, wherein the recycling information is generated based on the information about requirement of the granules, the recycling information is generated by using a computer, and the recycling information is sent via a network.

The toner recycling method according to still another aspect of the present invention comprises a toner collection process of collecting toner; a granulation process of manufacturing granules from the toner; a receiving process of receiving recycling information about toner required for manufacturing of the granules by the purchaser; and a toner information management process of managing the recycling information and managing information about the toner collected based on the recycling information, by using a computer.

The toner recycling method according to still another aspect of the present invention comprises a toner collection process of collecting toner used in image formation; and a granulation process of manufacturing granules by mixing the toner with other component.

The toner recycling method according to still another aspect of the present invention comprises a toner collection process of collecting toner used in image formation and providing the toner to a granulation process of manufacturing granules.

The toner recycling method according to still another aspect of the present invention comprises a granulation process of manufacturing granules by mixing toner used in image formation with other component.

The toner recycling system according to still another aspect of the present invention comprises a collection information management unit that manages information about a toner collected at a toner collection site; a recycling information generation unit that generates recycling information, wherein the recycling information includes information about a requirement of toner in the granulation site; and a display unit installed at the toner collection site and that displays the recycling information.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 shows a collection process of a non-standardized toner in the first embodiment;

FIG. 4 is a process diagram of a toner manufacturing procedure in a toner-manufacturing factory;

FIGS. 8A, 8B, and 8C show purchase management information of a toner and of a flux in a second embodiment;

DETAILED DESCRIPTION

Exemplary embodiments of the method and the system according to the present invention are explained below by referring to the accompanying drawings.

A toner recycling in the present invention is explained below before explaining the toner recycling system in the first embodiment of the present invention.

Figure 1:
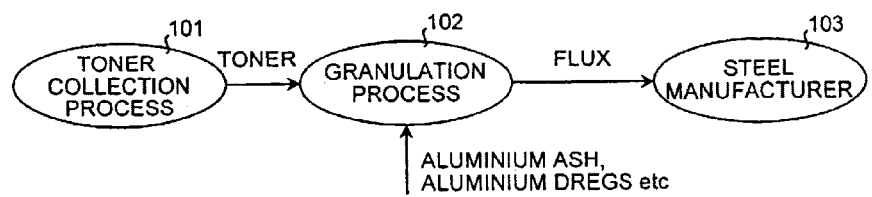
FIG. 1 shows a toner recycling method in a first embodiment of the present invention.

FIG. 1 is for explaining the toner recycling. The toner recycling carried out in the first embodiment includes a toner collection process 101 in which a toner used for an image formation is collected and a granulation process 102 of mixing the toner with other material and manufacturing granules that are used in industry. This recycling belongs to a recycling of material, which is mentioned as a recycling method earlier.

A flux is manufactured by mixing the collected toner with at least one of aluminum dregs, mineral based powder particles, and metal-based powder particles made from aluminum dross, aluminum ash, and aluminum mineral dregs generated during an aluminum refining process. The flux is a material which is added for reduction of oxidized iron in slag, heat retention and improvement of slag fluidity, deoxidization, desulferization, making of dregs of a molten iron, cast iron and steel ingot during steel making process like pig iron making in a blast furnace, steel making in an electric furnace, and cast making. In other words, the toner is recycled as the flux.

Following is a detailed explanation of the toner collection process 101 and the granulation process 102.

1. Toner Collection Process

In the toner collection process 101, toner remained in a used toner receptacle is recovered or a non-standardized toner that is produced during toner making process is collected. When the toner remained in the used toner receptacle is recovered in the toner collection process, the toner collection process is also called as a used toner collection process. When the non-standardized toner that is produced during the toner making process is collected, the toner collection process is also called as a non-standardized toner collection process.

1.1 Used Toner Collection Process

The used toner collection process includes a recovery process and a separation process. The recovery process includes recovering image forming apparatuses itself or the units or the consumable products built-in the image forming apparatuses of the users. The separation process includes separating the toner from the recovered image forming apparatuses, units, and consumable products.

Figure 2:
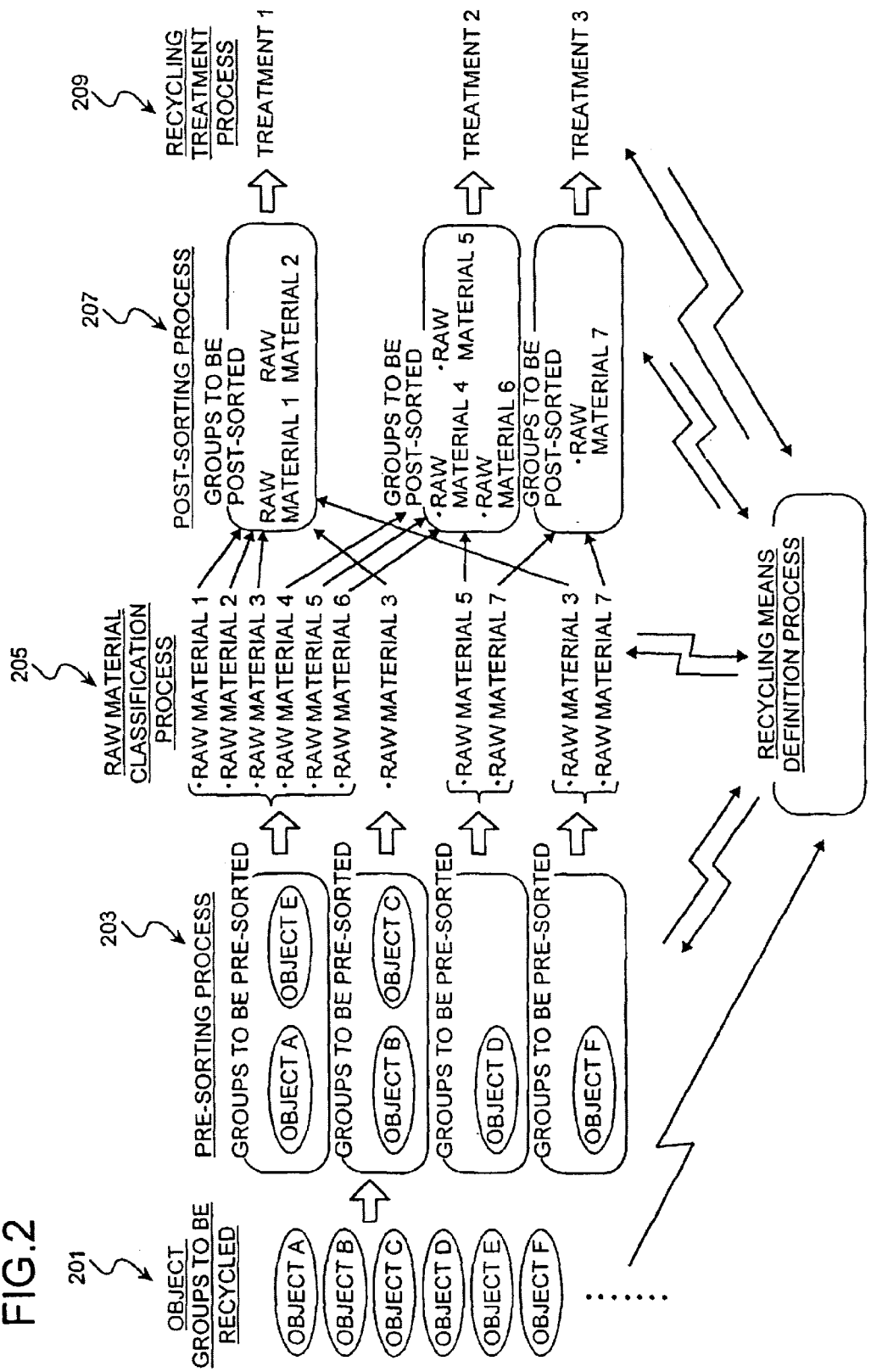
FIG. 2 shows a recovery process and a separation process in the first embodiment.

FIG. 2 shows the recovery process and a separation process. FIG. 2 indicates a recovery process 201 and a separation process. The recovery process includes recovering objects to be recycled (objects A, B, C, ... ) from the market. The objects are, for example, the image forming apparatuses or the units or the consumable products built-in the image forming apparatuses and containing toner. The classification process includes a pre-sorting process 203 of simplifying work in classification process from object group to be recycled onward, a raw material classification process 205 of classifying a sorted object to be recycled according to it's material, and a post-sorting process 207 of sorting the material classified.

The toner is classified in the raw material classification process 205, and from this classified toner, the toner to be sent to the granulation process 102 for making flux is further classified in the post-sorting process 207. Moreover, the classification of toner to be used for flux in the post-sorting process 207 is based on conditions like whether the toner is a resin, whether the toner is mixed with a carrier.

The toner is classified, in the toner collection process 101, using the color of the toner. Since the toner classified using color is processed in the granulation process 102, it enables the adjustment of mixing proportion of toner of each color when the toner is to be mixed with aluminum dross and aluminum ash. Thus, it is possible to make flux, which is having a uniform color by keeping the mixing proportion uniform all the time. It is also possible to make flux, which is having different color depending on an application and a customer.

The recovery process and the classification process can be carried out at sites that are spaced apart from each other. In that case, the recovery process may be carried out at a site (recovery center) which is convenient for recovery of the objects. On the other hand, the classification process is carried out at a site (recycling center) which is convenient for classification of the objects.

The materials sorted in the post-sorting process 207 are provided to any one of the recycling treatments in the recycling treatment process 209. The granulation process 102 of making the flux is one of the recycling treatments conducted at the recycling treatment process 209 in FIG. 2.

1.2 Non-Standardized Toner Collection Process

FIG. 3 is an illustration for explaining the non-standardized toner collection process. The non-standardized toner collection process 301 is carried out in a toner-manufacturing factory 302 and includes collection of a non-standardized tone. The non-standardized tone is, for example, a toner that is originally manufactured as powder ink for using in the image forming apparatus but judged to be unsuitable for using in the image forming apparatus. A toner is judged to be the non-standardized toner when, for example, the toner size is not in a standard range or when a toner is no more used because the toner is replaced with some other toner.

FIG. 4 explains a toner manufacturing procedure in a toner-manufacturing factory 302. First, a raw material of toner is feed (step S1). The raw material is a mixture of a binder resin, which is a main component of the toner, and a small amount of colorant. Thereafter, the toner is formed by carrying out polymerization or mixing and grinding of the raw material (step S2).

The toner is classified as a standardized toner or a non-standardized toner, based on the toner size (step S3). The toner classified as the non-standardized toner is collected in a container like a flexible container. Thereafter, the toner is sent to the granulation process (to the manufacturer of flux) as a raw material of flux (step S6).

On the other hand, a small amount of additives etc. is added to the toner classified as the standardized toner. This treatment is called as a post treatment (step S4). The post treated standardized toner is filled up in a toner receptacle (step S5). The toner receptacles are then sent to a toner shop or a factory where image forming apparatus like the copier, the facsimile etc. are manufactured.

2. Granulation Process

The toner collected is supplied to the granulation process 102. In the granulation process, the toner is mixed with at least one of aluminum dregs, mineral based powder particles, and metal based powder particles made from aluminum dross, aluminum ash, and aluminum mineral dregs generated during an aluminum refining process. Aluminum dross, aluminum ash etc. are generated in the form of powders in a process of achieving metal from ore.

The toner mixed with the powder particles functions as a binder in the manufacturing process of the flux. Since the toner does not react with metal aluminum or aluminum nitride etc., which is an aluminum based compound, there is no deterioration of quality of the flux. The binder formed by mixing the toner with the powder particles, is superior in formability as compared to conventional binders (tar or pitch) and does not affect the working environment even when added to the molten iron or cast iron. Furthermore, in the case of the conventional binder, it is necessary to heat the binder while being mixed with the powder particles. Therefore, a means for heating the binder is required at the site of the granulation process. However, a softening point of the toner made of resin is lower than the temperature of heat generated by friction and compression of the powder particles that are subjected to granulation. Therefore, the toner can be mixed with the powder particles without heating.

In concrete terms, forming methods used in the granulation process 102 can be divided mainly into wet forming (using a pelletizer or a low pressure briquetting machine) and dry forming (using a high pressure briquetting or rotary press). However, in the case of the granulation process of manufacturing flux, the metal aluminum or the aluminum nitride, which is a main component of the flux, reacts with moisture content. Therefore, it is desirable to use the dry forming method. Moreover, in the dry forming, the use of high-pressure briquetting is desirable since the high-pressure briquetting leads to a high productivity and a low manufacturing cost. The high-pressure briquetting machine exerts a roll pressure between 10 tons/cm$^2$ to 20 tons/cm$^2$ on the powder particles in normal operation thereby raising the roll temperature up to 60° C. to 80° C. Therefore, when a toner having a melting point of about 60° C. is used, the softening can be done without carrying out a separate heating treatment. Thus, the use of a toner as binder for the flux can reduce a cost of granulation equipment and the number of steps in granulation process.

Moreover, since the toner is minute and granular, a surface area of the toner is large with respect to a total volume of the toner. Therefore, a friction surface of toner becomes large, which results in a high friction compression efficiency thereby improving a thermal conductivity and fluidity of the toner. Moreover, toner can be heat more efficiently.

Figure 5:
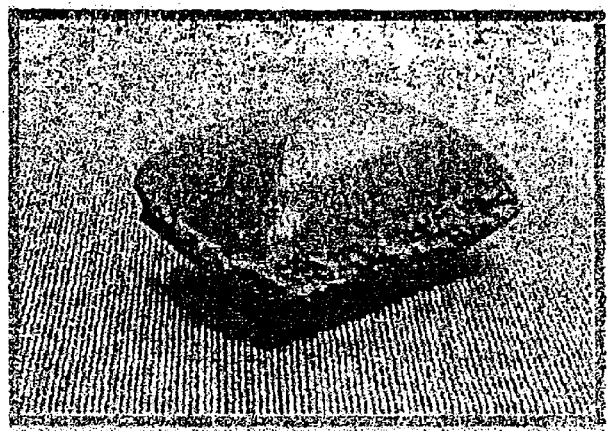
FIG. 5 shows a rectangular shaped granule of flux having blunt corners.

The flux, which is granular, is pillow-shaped with blunt corners, having a convex top face and a bottom face with same curvature of top and bottom convex surfaces, and the curvature is less than that of a spherical surface of a sphere. FIG. 5 shows the shape of a granule.

The granules with pillow-shape produce following advantages. That is, the granules are hard to roll and there is less friction of granules with surrounding, which facilitates the handling of flux during transportation and during mixing with the metal particles. Moreover, the flux can be formed by die molding method, it is easy to die mold the granules. Moreover, maintenance of the die used for molding is easy. As a result, the process of formation of the flux becomes simple.

However, the shape of the flux to be used in the steel industry is not restricted to the pillow-shape. The flux can also be cylindrical. The cylindrical flux is further easy to form.

Following is an explanation of a toner recycling method and a toner recycling system of the first embodiment of the present invention. This recycling method includes a toner collection process and a granulation process for making of flux. Information about a requirement of a flux by a manufacturer who purchases the flux is acquired. Based on this information, recycling information required by the manufacturer of flux about a toner, which is required by the flux manufacturer, is generated using a computer and transmitted through a network to the flux manufacturer. Further, the transmitted recycling information is received, and based on this recycling information received, a management of information about the toner that is collected in toner collection process is done.

Figure 6:
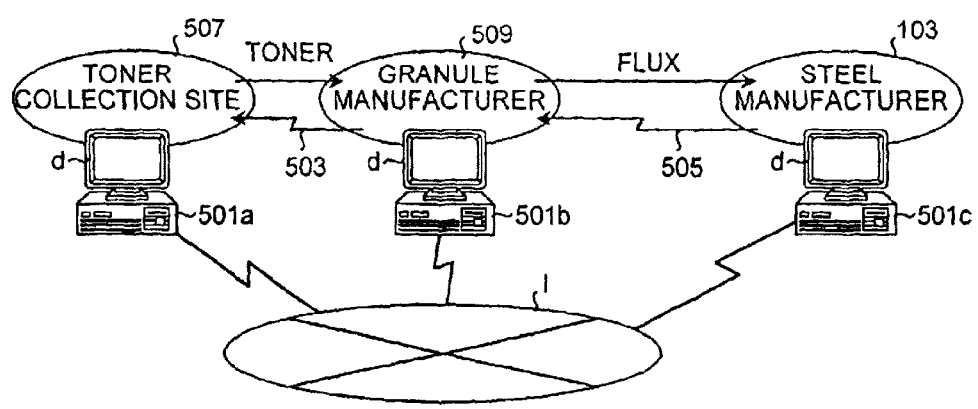
FIG. 6 shows a toner recycling system in which the toner recycling method in the first embodiment of the present invention is applied.

FIG. 6 shows a toner recycling system in which the toner recycling method in the first embodiment is applied. In this toner recycling system, information is transmitted between a toner collection site 507 where the toner collection process is carried out and a manufacturer of granulation 509 where a granulation process is carried out by mixing the collected toner with other material.

Either of a used toner recovery site and a non-standardized toner recovery site, can be the toner collection site 507. The granules are manufactured by the granulation process 102 at the granule-manufacturing site.

The granules is a flux made by mixing the toner with at least one of aluminum dregs, mineral based powder particles and metal based powder particles made from aluminum dross, aluminum ash and aluminum mineral dregs generated during an aluminum refining process. A steel manufacturer 103 purchases the flux from the granule manufacturer and uses it in a process of steel making. Therefore, the flux is transported from the granule manufacturer 509 to the steel manufacturer 103.

The toner collection site 507 has a personal computer (PC) 501a, the granule manufacturer 509 has a PC 501b, and the steel manufacturer 103 has a PC 501c. These PCs are connected to each other by the Internet I.

The steel manufacturer 103 transmits the conditions of flux required from the granule manufacturer 509 as a steel manufacturer's requirement 505 to the PC 501b through the Internet I. The PC 501b at the granule manufacturer 509 acquires information about the requirement of flux by the steel manufacturer 103 and generates the recycling information, which includes the information about the toner required for the manufacturing of flux demanded by the steel manufacturer 103. The PC 501a receives the recycling information, from the PC 501b through the Internet I, and carries out management of the collected toner based on the recycling information that is received.

The PC 501a is a device for management of collection information about the toner collected in the toner collection site 507. Moreover, the PC 501b is a device for generation of recycling information 503 that includes the information about the requirement of the toner by the granule manufacturer 509. Besides, the PC 501a is also a device for displaying information about toner that fulfils recycling conditions from the toner information. When displaying the information, it is, for example, displayed on a display screen d of the PC or transmitted to a printer get printed on a paper.

The steel manufacturer's requirement 505 is taken as acceptance conditions for the flux based on quality of a material of flux and the recycling information 503 is taken as acceptance conditions for the toner which are conditions for the toner for manufacturing the flux that fulfils the acceptance conditions of the flux. The toner acceptance conditions are conditions that are mainly determined with the object of having a satisfactory quality of steel or of the flux.

Figure 7:
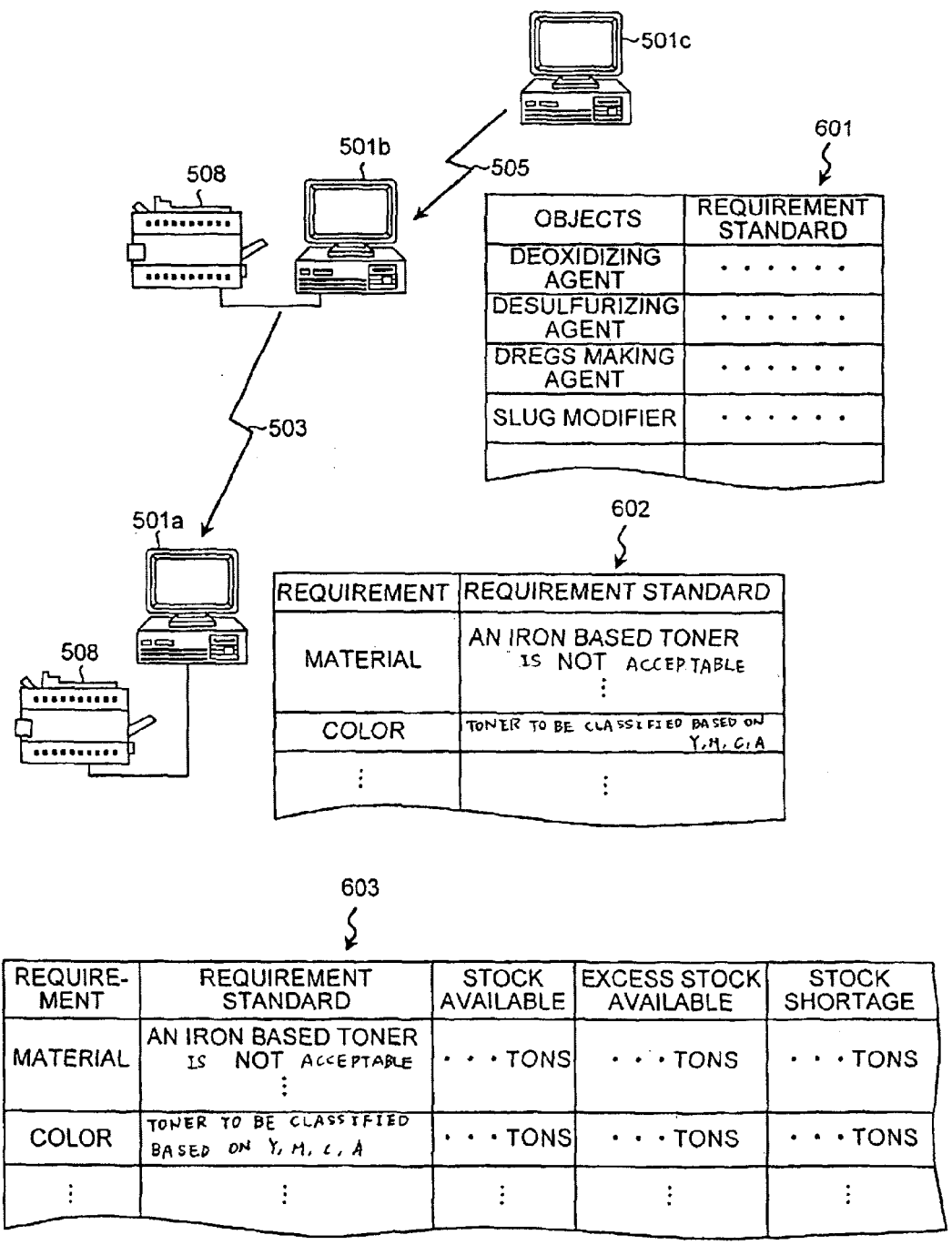
FIG. 7 shows acceptance conditions for flux.

FIG. 7 is an explanation of flux acceptance conditions 601 and toner acceptance conditions 602. The steel manufacturer 103 expects certain standard of flux, which is an additive for manufacturing high quality steel. The flux is classified into, for example, deoxidizing agent, desulferizing agent, dregs making agent, and slag modifier. The flux acceptance conditions 602 are determined for each of the classified type.

The flux acceptance conditions 601 are displayed on the display screen d of the PC 501b at the granule manufacturer 509. The flux acceptance conditions 601 for flux can be output on a paper by a printer 508 that is connected to the PC 501b.

The granule manufacturer 509 generates the toner acceptance conditions 602 based on the flux acceptance conditions 601. The toner acceptance conditions are determined by considering at least one standard viz. toner material, whether any material is to be mixed with the toner or not, material to be mixed with the toner, and toner color. Two toner acceptance conditions are shown in FIG. 7. One is 'an iron based toner (a toner containing an iron) not acceptable' and the other is 'toner to be classified according to colors C, M, Y, and K'.

The toner acceptance conditions 602 are transmitted from the PC 501b to the PC 501a. These acceptance conditions 602 are then displayed on the display screen d of the PC 501a at the toner collection site 507. The displayed toner conditions 602 can be output on a paper by the printer 508, which is connected to the PC 501a.

The PC 501a manages the information of the toner by preparing a management data 603 that includes the information of the toner collected based on the toner acceptance conditions 602 shown in FIG. 7. The management data 603 includes the toner information such as a stock of toner that fulfils the toner acceptance conditions (stock available), an excess quantity of toner available after subtracting the quantity of toner demanded from the stock (excess stock available), and stock shortage etc. The quantities may be expresses in tones.

According to the first embodiment, only the toner, which fulfils the toner acceptance conditions 602, is supplied to the granule manufacturer 509. Therefore, there is no deterioration of a quality of the flux due to the toner. Moreover, since the toner acceptance conditions are determined based on the acceptance conditions for the flux, it is possible to improve the quality of the flux.

Moreover, the management of the toner information based on the toner conditions required by the granule manufacturer 509 is possible at the toner collection site 507. As a result, better planning of toner collection can be done along with prompt dealing with inquiries and requirement by the granule manufacturer 509.

A composition of a toner recycling system according to a second embodiment of the present invention is same as that shown in FIG. 6. The recycling system in the second embodiment includes the steel manufacturer's requirement 505, which is the purchase management information of the flux and about a quantity of flux that is required from the granule manufacturer 509 and the recycling information 503, which is the purchase management information of the toner indicating a quantity of the toner that is received by the granule manufacturer 509 from the toner collection site 507. The quantity of toner indicated in the purchase management information of the toner is supplied from the toner collection,site 507 to the granule manufacturer 509.

FIGS. 8A, 8B, and 8C show a flux purchase management information 701, a toner purchase management information 702, and an information 703 (management data) of toner collected, which is managed based on the toner purchase management information 702, respectively. The flux purchase management information 701 and the toner purchase management information 702 are conditions determined with an object of management of quantity of flux that is manufactured.

FIG. 8A is an illustration of the flux purchase management information 701. The flux purchase management information 701 includes purchase quantity, classification (deoxidizing agent etc.), and quantity (t) of flux purchased by the steel manufacturer 103 on monthly basis.

FIG. 8B is an illustration of the toner purchase management information 702. The toner purchase management information 702 includes quantity of toner purchased on the toner collection site and classification of toner into Y, M, C, and K, on monthly basis. Moreover, the toner purchase management information 702, which is the recycling information in the second embodiment, includes a product code of toner and manufacturing code (Lot No.) for each lot when the toner is supplied to the toner collection site 507 in lots.

The flux purchase management information 701 is displayed on the display screen d of the PC 501b at the granule manufacturer 509. The flux acceptance information 601 can be output on a paper by the printer 508 that is connected to the PC 501b. The toner purchase management information 702 is displayed on the display screen d of the PC 501a at the toner collection site 507. The toner purchase management information can be output on a paper by the printer 508 that is connected to the PC 501a.

The granule manufacturer 509 generates the toner purchase management information 702 based on the flux purchase management information 701 using the PC 501b and transmits the toner purchase management information 702 to the PC 501a. The PC 501a generates the management data of the toner collected, based on the toner purchase management information 702 and manages the information of the toner collected. The toner information in the management data 703 includes for example, a data of quantity such as a stock of toner that fulfils the toner acceptance conditions, an excess quantity of toner available after subtracting the quantity of toner demanded from the stock, and stock shortage etc. The toner information in the management data 703 includes for example, storage site data, which indicate sites of recycling where the toner is stored, particularly in a case when there is a plurality of recycling sites.

According to the second embodiment, at the toner collection site 507, the toner is supplied to the granule manufacturer 509 according to the toner purchase management information 702. Thus, the granule manufacturer 509 is supplied with the toner that is required for flux without much shortage, which allows him to carry out stable manufacturing of the flux. Besides, the prediction and management of the quantity of the toner to be collected, storage quantity of toner, quantity of toner shipped can be done at the toner collection site 507.

Moreover, since the management of the toner information based on the toner conditions required by the granule manufacturer 509 is possible at the toner collection site 507, better planning of toner collection can be done along with prompt dealing with inquiries and requirement by the granule manufacturer 509.

Figure 9:
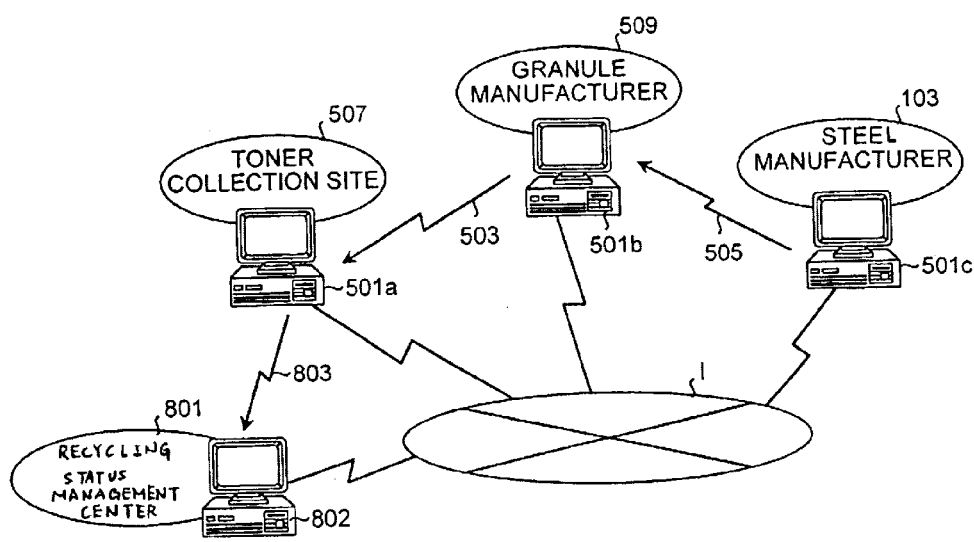
FIG. 9 shows a toner recycling system and a toner recycling method in a third embodiment.

FIG. 9 shows a toner recycling system and a toner recycling method according to a third embodiment of the present invention. This toner recycling system has a recycling status management center 801 in addition to the toner collection site 507, the granule manufacturer 509, and the steel manufacturer 103 explained in the first and the second embodiments. The recycling status management center 801 is connected to the Internet I through a PC 802.

The recycling status management center 801 manages a recycling status information. The recycling status information includes at least one of a status of toner collection at the toner collection site 507, a status of toner supply to the granule manufacturer 509, and a status of use of granules that are supplied from the granule manufacturer 509 to the steel manufacturer 103.

Figures 10A, 10B:
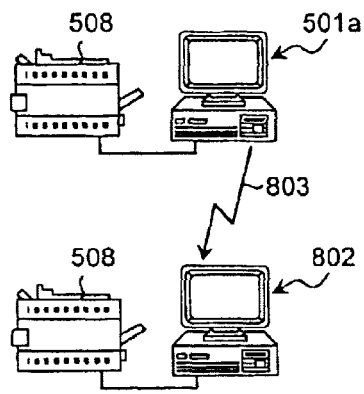
FIGS. 10A and 10B show information about recycling status.

FIGS. 10A and 10B show the recycling status information 803. FIG. 10A is an explanation of transmission of the recycling information and FIG. 10B is an illustration of the recycling status information 803. The recycling status information 803 is transmitted from a PC at each site to the PC 802 at the recycling status information center 801. In FIG. 10A is an example of the recycling status information 803 that is transmitted from the PC 501a at the toner collection site 507 to the PC 802. Furthermore, the recycling status information 803, which is transmitted to the PC 802, can be output on a paper by a printer 508 that is connected to the PC 802.

As shown in FIG. 10B, the recycling status information 803 includes a collection information about the toner collection quantity, an information that is provided to the granule manufacturer about the quantity of toner supplied to the granule manufacturer 509, an information that is not provided to the granulation site (granule manufacturer) about the quantity and treatment of toner that is collected but not sent to the granule manufacturer 509.

Thus FIG. 10B shows an INPUT (quantity collected), which is the collection information in terms of toner weight on monthly basis. Further, an OUTPUT from the toner collection site 507 is shown in terms of means of treatment (supplied to) and toner weight that is supplied to each user, on monthly basis.

In a column that shows a reference numeral 'm' in the figure, the granule manufacturer and iron works are mentioned as means. Information of toner, which is provided to the granule manufacturer 509, is the information that is provided to the granule manufacturer. Whereas, the toner that is supplied to the iron works is used as a sintering material and an information of the toner is the information that is not provided to the granule manufacturer.

The PC 802 calculates at least one of a recycling rate data, a material recycling rate data, and an energy recovery rate data by using the collection information, the information that is provided to the granule manufacturer, and the information that is not provided to the granule manufacturer. The recycling status management center 801 manages the information, which includes at least one of the recycling rate data, the material recycling rate data, and the energy recovery rate data.

The recycling rate data is a data that indicates the weight of goods recycled out of the total weight of goods that are collected (recovered) as recycling goods. The material recycling rate data is a data that indicates the weight of material recycled out of the total weight of goods that are collected (recovered) as recycling goods. The energy recycling rate data is a data that indicates the weight of goods that were made to undergo energy recovery out of the total weight of goods that are collected (recovered) as recycling goods.

According to the third embodiment, it is possible to carry out management of an overall recycling system and to know the recycling efficiency. Thus, it becomes possible to know the status of toner recycling being carried out and to carry out the toner recycling more efficiently even in a case where there is a plurality of sites of toner collection 507.

Although all the toner-recycling systems in the first to the third embodiments use the Internet for transfer of data. However, a LAN may be used instead of the Internet.

In all the first to the third embodiments, a composition that includes the toner collection site 507 as the site for toner collection is explained. However, the present invention is not restricted only to such a composition. Compositions shown in FIG. 11 to FIG. 14 are also possible. Although network connecting each site is not shown in FIG. 11 to FIG. 14, it is assumed that each site is connected by network.

Figure 11:
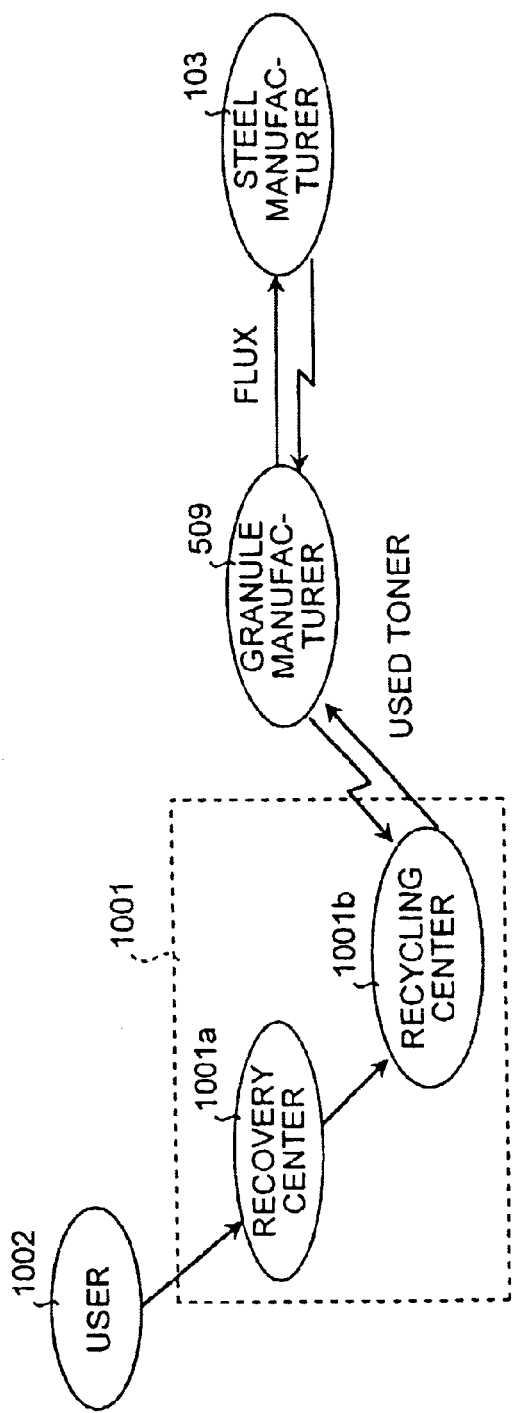
FIG. 11 is another example of the recycling system.

In a toner recycling system shown in FIG. 11, recycling goods and consumable product (for example a toner cartridge) that are recovered from a user 1002 are collected at a recovery center 1001a. Further, toner is classified at a recycling center 1001b. The recovery center 1001a and the recycling center 1001b constitute a toner collection site 1001.

Figure 12:
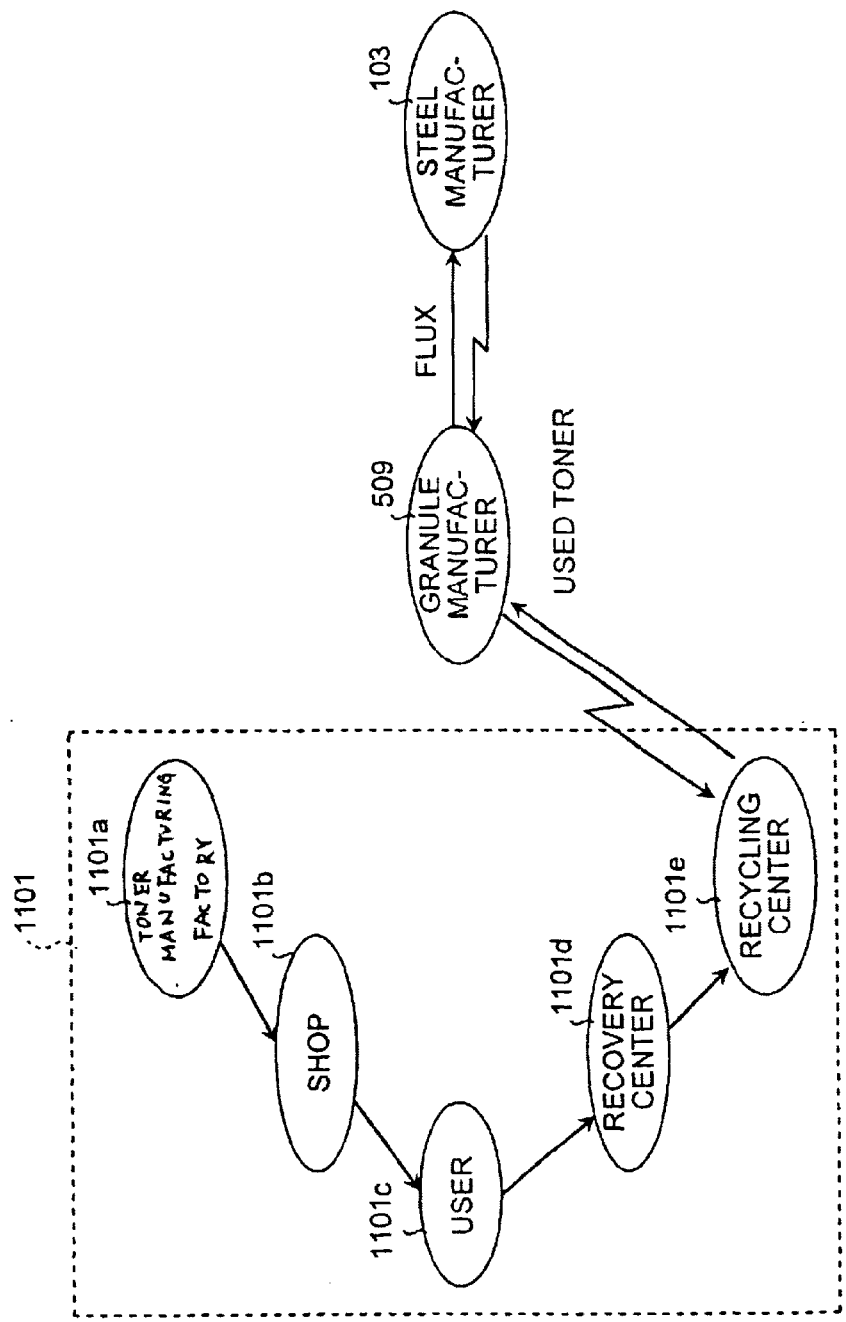
FIG. 12 is still another example of the recycling system.

In a toner recycling system shown in FIG. 12, a toner manufacturing factory 1101a, a shop 1101b, a user 1101c, a recovery center 1101d, and a recycling center 1101e constitute a toner collection site 1101. Information of the whole of the toner collection site 1101 is included in recycling information or can be added to the information that is managed in the recycling status management center 801.

Figure 13:
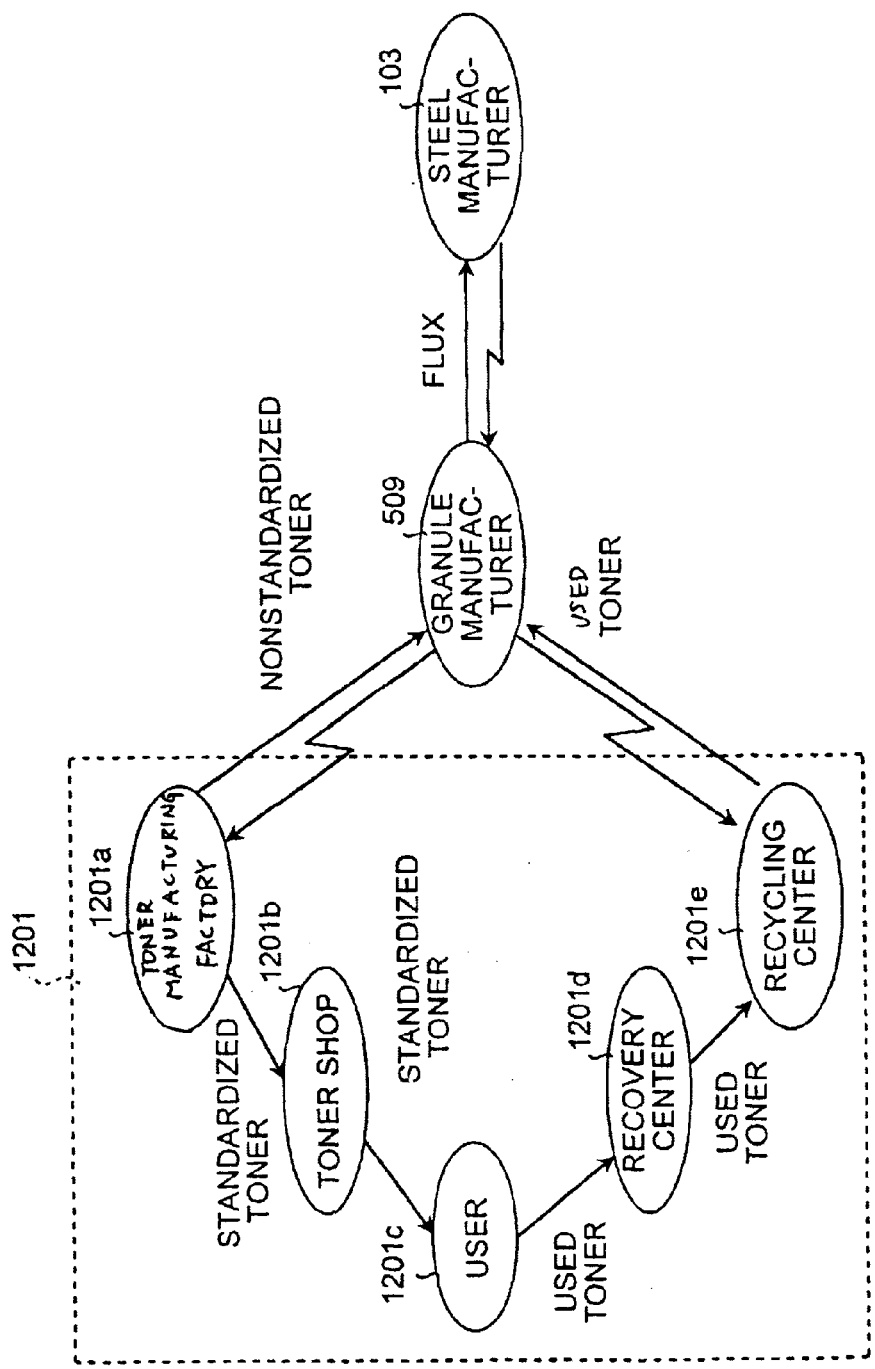
FIG. 13 is still another example of the recycling system.

In a toner recycling system shown in FIG. 13, there are two sites of toner collection processes viz. recycling center 1201e and a toner manufacturing factory 1201a. At the recycling center 1201e, a used toner collection process is carried out and a toner manufacturing factory 1201a and at the toner manufacturing factory 1201a a non-standardized toner collection process is carried out. The granule manufacturer 509 sends the recycling information to the recycling center 1201e and the toner manufacturing factory 1201a.

Figure 14:
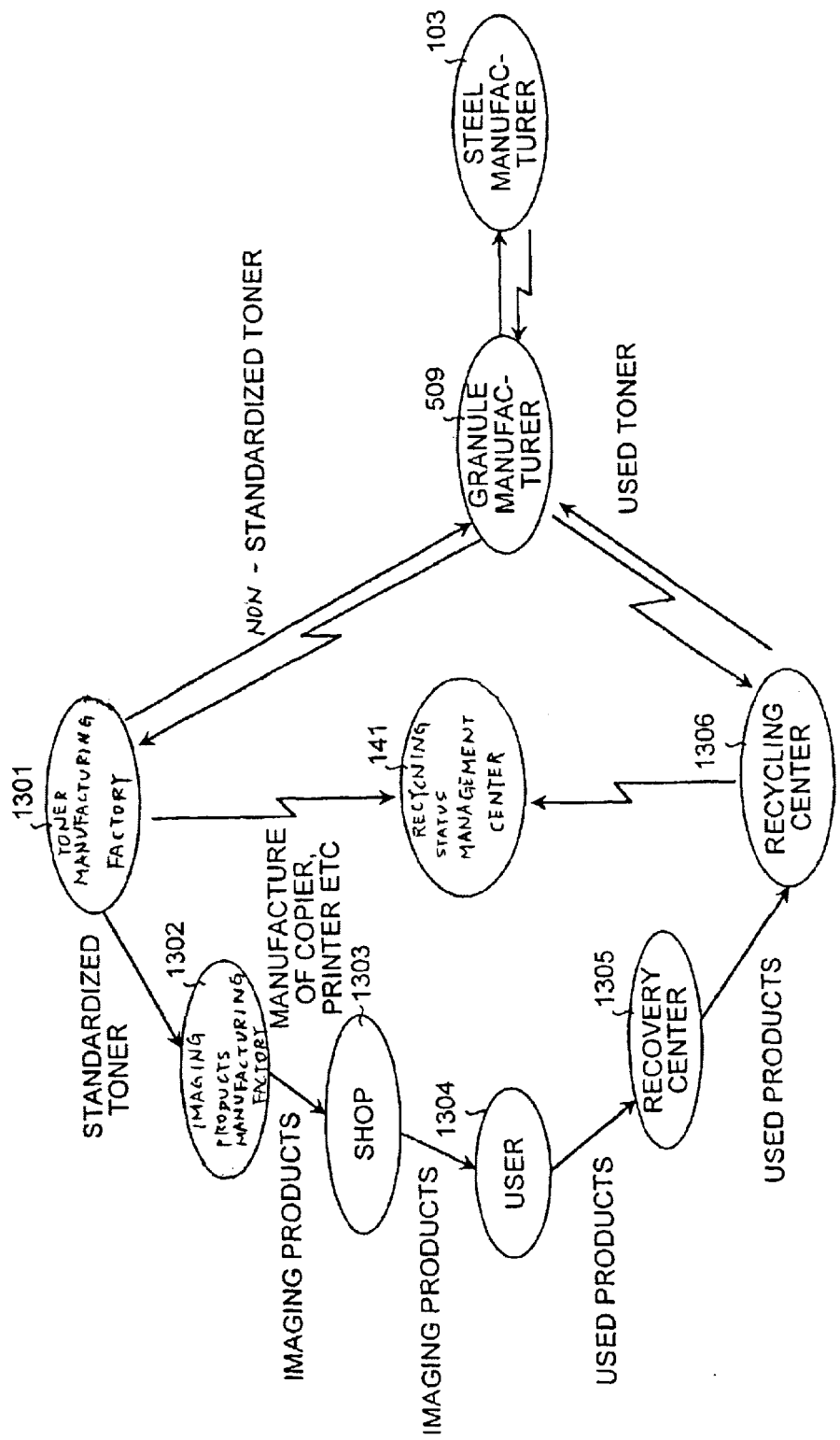
FIG. 14 is still another example of the recycling system.
Figure 15:
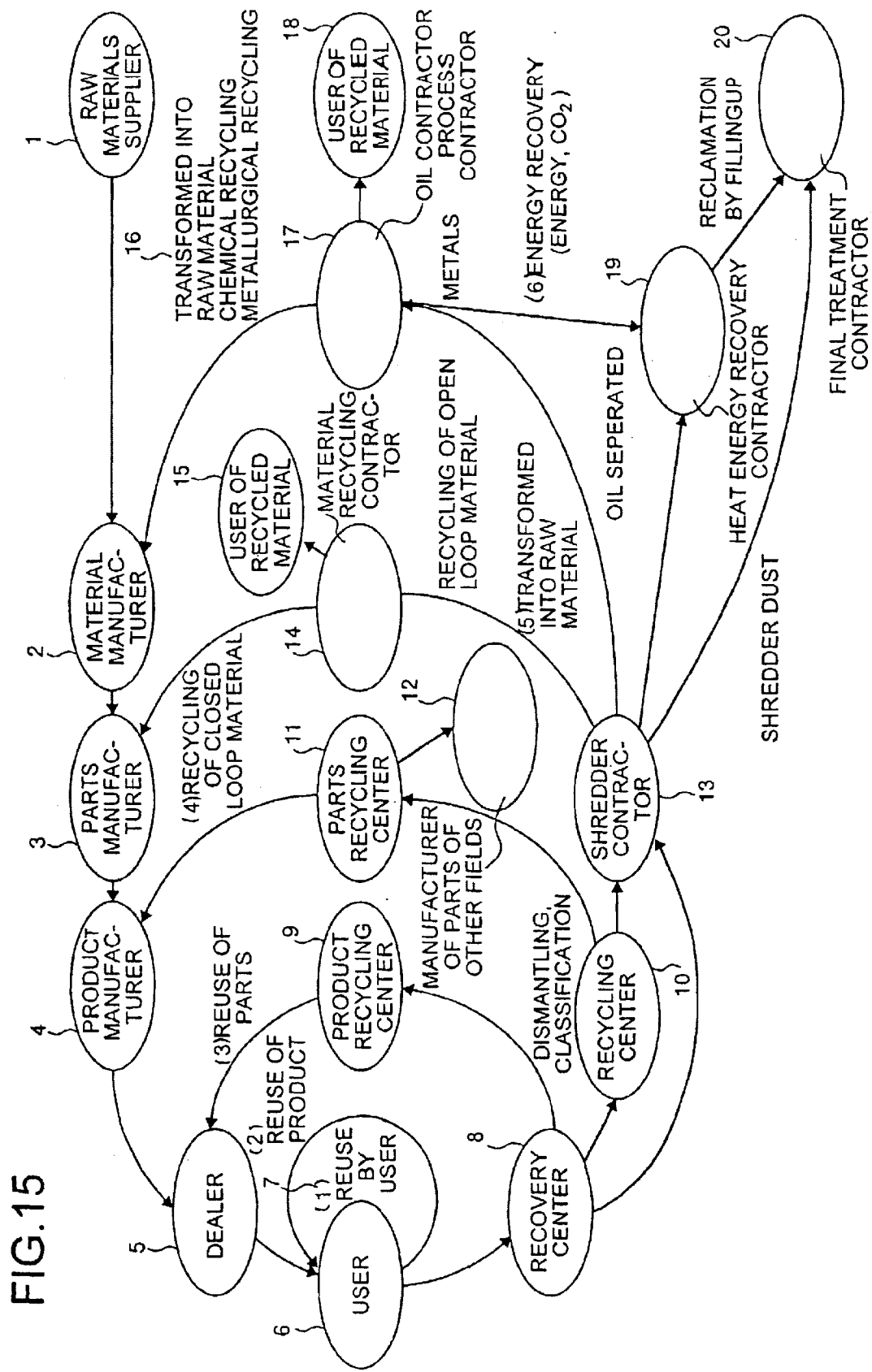
FIG. 15 shows a general concept of a conventional recycling system.

In a toner recycling system shown in FIG. 14, a factory of imaging products where image-forming apparatuses like a copier, printer etc. and peripheral equipments are manufactured, are also included in the toner collection site. Moreover, information of the factory of imaging products is also included in the recycling information or can be added to the information that is managed in the recycling status management center 801.

In the tone recycling system shown in FIG. 14, the toner manufactured in a toner-manufacturing factory 1301 is sent to an imaging product-manufacturing factory 1302. In the imaging product-manufacturing factory 1302, the toner is set in a prescribed receptacle inside an image-forming unit or filled in a consumable product like toner bottle etc. and shipped. A user 1304 through a shop 1303 purchases the shipped imaging product. The used imaging product is recovered in a recovery center 1305. Toner is classified in a recycling center 1306. Moreover, the toner manufacturing factory 1301 and the recycling center 1306 transmits information that indicates a recycling status to the recycling status management center 141.

According to the recycling system in FIG. 14, all the processes from the toner manufacturing to the recycling can be collectively managed at the recycling status management center. As a result, status of supply to the granule manufacturer and collection status in more details can be grasped.

As explained above, first to third aspects of the present invention provides a toner recycling method that enables to continue recycling for a long period of time. Moreover, it is possible efficiently perform the processes involved in the toner recycling.

A fourth aspect of the present invention provides a toner recycling method in which recycling can be carried continuously since it is possible to gain profit by selling granules that can be used in industry.

A fifth and a sixth aspect of the present invention provides a toner recycling method in which recycling can be carried continuously for a long period of time since it is possible to gain profit by selling granules that can be used in industry.

A seventh aspect of the present invention provides a toner recycling method in which recycling can be carried continuously since it is possible to gain profit by selling flux. Moreover, the seventh aspect provides a toner recycling method that provides a binder suitable for manufacturing of flux.

According to an eighth aspect of the present invention, it is possible to manufacture flux using materials that are generated in metal refining process thereby enabling the acceleration of recycling of resources. Moreover, the eighth aspect provides a toner recycling method that provides a binder suitable for manufacturing of flux by using granules generated in steel manufacturing process.

According to a ninth aspect of the present invention, a recycling of resources is accelerated. Moreover, the ninth aspect provides a toner recycling method that collects toner prior to mixing with a carrier, which is suitable to be used as a binder of flux.

According to a tenth aspect of the present invention, a recycling of resources is accelerated. Moreover the tenth aspect provides a toner recycling method that collects toner efficiently prior to mixing with a carrier, which is suitable to be used as a binder of flux.

An eleventh aspect of the present invention provides a toner recycling method that carries out toner recycling efficiently by collecting used toner in efficient manner.

A twelfth aspect of the present invention provides a toner recycling method that efficiently carries out management of toner recycling by arranging a site of process in a location that is suitable for processes of recovery, classification respectively.

A thirteenth aspect of the present invention provides a toner recycling method in which granules of optional colors can be formed by adjusting the mixing proportion of toners of various colors.

A fourteenth aspect of the present invention provides a toner recycling method in which a reliable supply of granules is made to a manufacturer that purchases granules, by providing granules of a uniform color all the time.

A fifteenth aspect of the present invention provides a toner recycling method in which an efficient processing of toner recycling can be done by improving the processing efficiency of manufacturer (manufacturing site), granulation process, and toner collection process respectively.

A sixteenth aspect of the present invention provides a toner recycling method, which provides granules of highly reliable quality. The quality of granules is constantly maintained above certain standard.

A seventeenth aspect of the present invention provides an efficient toner recycling method that enables better planning of a toner collection and a granule manufacturing.

An eighteenth aspect of the present invention provides a toner recycling method that has a high management efficiency of toner in a toner collection process and granulation process.

A nineteenth aspect of the present invention provides a toner recycling method in which an efficient processing of a toner recycling is done by transmitting information between a toner collection process and a granulation process speedily and in a simple way.

A twentieth aspect of the present invention provides a toner recycling method in which an efficient processing of toner recycling is carried out by doing management of toner recycling status.

A twenty-first aspect of the present invention provides a toner recycling method in which an efficient processing of a toner recycling is carried out by doing management of toner recycling efficiency.

A twenty-second aspect of the present invention provides a toner recycling method, which improves the working efficiency of a process of granulation and a process using granules by making shape of granules that eases handling of granules.

A twenty-third aspect of the present invention provides a toner recycling method, which improves the working efficiency of process of granulation and process using granules by making shape of granules that eases formulation of granules.

A twenty-fourth aspect of the present invention provides a toner recycling system in which recycling can be done continued for a long period of time since it is possible to gain profit by selling granules that can be used in industry.

A twenty-fifth aspect of the present invention provides a toner recycling method in which recycling can be done continuously since it is possible to gain profit by selling granules that can be used in industry. Moreover, the twenty-fifth aspect provides a toner recycling method that provides a binder suitable for manufacturing flux.

According to twenty-sixth aspect of the present invention, it is possible to manufacture flux by using materials that are generated in a metal refining process thereby enabling an acceleration of recycling resources. Moreover the twenty-sixth aspect provides a toner recycling system that provides a binder suitable for manufacturing of flux by using granules generated in a steel manufacturing process.

A twenty-seventh aspect of the present invention provides a toner recycling system in which an efficient processing of toner recycling is carried out by doing collective management of information of toner processing carried out in toner manufacturing factory, shop, recovery center, and recycling center.

A twenty-eighth aspect of the present invention provides a toner recycling system in which an efficient processing of toner recycling is carried out in toner manufacturing factory, shop, recovery center, and recycling center.

A twenty-ninth aspect of the present invention provides a toner recycling system in which an efficient processing of toner recycling can be done by improving the processing efficiency of manufacturer (manufacturing site), granulation site, and toner collection process respectively.

A thirtieth aspect of the present invention provides a toner recycling system, which provides granules of highly reliable quality. The quality of granules is constantly maintained above certain standard.

A thirty-first aspect of the present invention provides a toner recycling system, which can efficiently carry out a processing in a toner recycling by enabling better planning of a toner collection and a granule manufacturing.

A thirty-second aspect of the present invention provides a toner recycling system, which can efficiently carry out a processing of toner recycling.

A thirty-third aspect of the present invention provides a toner recycling system in which an efficient processing of toner recycling is done by transmitting information between a toner collection process and a granulation process speedily and in a simple way.

A thirty-fourth aspect of the present invention provides a toner recycling system in which an efficient processing of toner recycling is carried out by doing management of toner recycling status.

A thirty-fifth aspect of the present invention provides a toner recycling system in which an efficient processing of toner recycling is carried out by doing management of toner recycling efficiency.

A thirty-sixth aspect of the present invention provides a toner recycling system in which a status of toner of each color can be understood promptly and a processing of toner recycling is carried out efficiently.

The present document incorporates by reference the entire contents of Japanese priority document, 2002-196487 filed in Japan on Jul. 4, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A toner recycling method comprising:

a toner collection process of collecting a toner;

a granulation process of manufacturing granules from the toner;

a requirement information acquiring process of acquiring information about requirement of the granules from a prospective purchaser of the granules;

a recycling information generation process of generating recycling information about a toner required for manufacturing of the granules by the purchaser and sending the recycling information, wherein the recycling information is generated based on the information about requirement of the granules, the recycling information is generated by using a computer, and the recycling information is sent via a network; and a toner information management process of receiving the recycling information and managing information about the toner collected based on the recycling information, by using a computer.

2. The toner recycling method according to claim 1, wherein the granules are used as a flux for manufacturing steel.

3. The toner recycling method according to claim 1, wherein the granulation process includes mixing the toner with at least one of aluminum dregs, mineral based powder particles, and metal-based powder particles made from aluminum dross, aluminum ash, and aluminum mineral dregs generated during an aluminum refining process.

4. The toner recycling method according to claim 1, wherein the toner collection process includes collecting toner remaining in a used toner receptacle.

5. The toner recycling method according to claim 1, wherein the toner collection process includes collecting non-standardized toner.

6. The toner recycling method according to claim 4, wherein the toner collection process comprises:
   a recovery process of recovering a toner containing unit, wherein the toner containing unit is one or more selected from a combination of an image forming apparatus, a built-in unit in an image forming apparatus from which toner can be recovered, and a consumable product; and
   a separation process of separating the toner remaining in the toner containing unit.

7. The toner recycling method according to claim 6, wherein the recovery process is carried out in a recovery center and the separation process is carried out in a recycling center.

8. The toner recycling method according to claim 6, wherein the separation process includes separating the toner based on a color of the toner.

9. The toner recycling method according to claim 8, wherein the granulation process includes mixing toners of different colors to manufacture the granules of a specific color.

10. The toner recycling method according to claim 1, wherein the recycling information includes toner acceptance standards for acceptance of toner by the granulation process from the toner collection process, the acceptance standards including at least one standard out of toner color, whether any material is to be mixed with the toner, a material to be mixed, and a toner material.

11. The toner recycling method according to claim 1, wherein the recycling information includes a purchase management information, wherein the purchase management information indicates an amount of toner to be received by the granulation process from the toner collection process and the amount of toner indicated in the purchase management information is provided by the toner collection process to the granulation process.

12. The toner recycling method according to claim 1, wherein in the toner collection process a product code is put on the toner, the toner is provided to the granulation process, and when the toner is provided in units of lots, a manufacturing code is put on each lot in the recycling information.

13. The toner recycling method according to claim 10, wherein the recycling information is transmitted via the Internet between a computer at a site of the granulation process and a computer at a site of the toner collection process.

14. The toner recycling method according to claim 11, wherein the recycling information is transmitted via the Internet between a computer at a site of the granulation process and a computer at a site of the toner collection process.

15. The toner recycling method according to claim 12, wherein the recycling information is transmitted via the Internet between a computer at a site of the granulation process and a computer at a site of the toner collection process.

16. The toner recycling method according to claim 1, further comprising:
   a status management process of managing information that includes at least one of a status of toner collection in the toner collection process, a status of providing of toner to the granulation process and a status of use of the granules provided by the granulation process to a steel manufacturer.

17. The toner recycling method according to claim 16, wherein the status management process includes managing at least one of the data among recycling rate data, material recycling rate data, and energy recovery rate data that is calculated by using a collection information about a quantity of toner collected, an information to be provided to the granulation process about a quality and a quantity of toner that is supplied to the granulation process, an information which is not provided to the granulation process about a quantity and disposal of a toner that is collected but not sent to the granulation process, the information of toner collection, and the information provided to the granulation process, and the information not provided to the granulation process.

18. The toner recycling method according to claim 1, wherein the granules are pillow-shaped with blunt corners, the pillow-shape being a shape having a convex top face and a bottom face with same curvature of top and bottom convex surfaces, and the curvature is less than that of a spherical surface of a sphere.

19. The toner recycling method according to claim 1, wherein the granules formed are substantially cylindrical.

20. The toner recycling system according to claim 17, wherein the granules are manufactured by mixing a toner with at least one of aluminum dregs, mineral based powder particles, and metal based powder particles made from aluminum dross, aluminum ash, and aluminum mineral dregs generated during an aluminum refining process.

21. A toner recycling method comprising:
   a granulation process of manufacturing granules using a toner;
   a requirement information acquiring process of acquiring information about requirement of the granules from a prospective purchaser of the granules; and
   a recycling information generation process of generating recycling information about a toner required for manufacturing of the granules by the purchaser and sending the recycling information, wherein the recycling information is generated based on the information about requirement of the granules, the recycling information is generated by using a computer, and the recycling information is sent via a network.

22. The toner recycling method according to claim 21, wherein the granules are used as a flux for manufacturing steel.

23. The toner recycling method according to claim 21, wherein the granulation process includes mixing the toner with at least one of aluminum dregs, mineral based powder particles, and metal-based powder particles made from aluminum dross, aluminum ash, and aluminum mineral dregs generated during an aluminum refining process.

24. The toner recycling method according to claim 21, further comprising a toner collection process that includes collecting toner remaining in a used toner receptacle.

25. The toner recycling method according to claim 21, further comprising a toner collection process that includes collecting non-standardized toner.

26. The toner recycling method according to claim 24, wherein the toner collection process comprises:
   a recovery process of recovering a toner containing unit, wherein the toner containing unit is one or more selected from a combination of an image forming apparatus, a built-in unit in an image forming apparatus from which toner can be recovered, and a consumable product; and
   a separation process of separating the toner remaining in the toner containing unit.

27. The toner recycling method according to claim 26, wherein the recovery process is carried out in a recovery center and the separation process is carried out in a recycling center.

28. The toner recycling method according to claim 26, wherein the separation process includes separating the toner based on a color of the toner.

29. The toner recycling method according to claim 28, wherein the granulation process includes mixing toners of different colors to manufacture the granules of a specific color.

30. The toner recycling method according to claim 21, wherein the recycling information includes toner acceptance standards for acceptance of toner by the granulation process from a toner collection process, the acceptance standards including at least one standard out of toner color, whether any material is to be mixed with the toner, a material to be mixed, and a toner material.

31. The toner recycling method according to claim 21, wherein the recycling information includes a purchase management information, wherein the purchase management information indicates an amount of toner to be received by the granulation process from a toner collection process and the amount of toner indicated in the purchase management information is provided by the toner collection process to the granulation process.

32. The toner recycling method according to claim 21, wherein in a toner collection process a product code is put on the toner, the toner is provided to the granulation process and when the toner is provided in units of lots, a manufacturing code is put on each lot in the recycling information.

33. The toner recycling method according to claim 30, wherein and the recycling information is transmitted via the Internet between a computer at a site of the granulation process and a computer at a site of the toner collection process.

34. The toner recycling method according to claim 31, wherein the recycling information is transmitted via the Internet between a computer at a site of the granulation process and a computer at a site of the toner collection process.

35. The toner recycling method according to claim 32, wherein the recycling information is transmitted via the Internet between a computer at a site of the granulation process and a computer at a site of the toner collection process.

36. The toner recycling method according to claim 21, further comprising:
a status management process of managing information that includes at least one of a status of toner collection in the toner collection process, a status of providing of toner to the granulation process, and a status of use of the granules provided by the granulation process to a steel manufacturer.

37. The toner recycling method according to claim 36, wherein the status management process includes managing at least one of the data among recycling rate data, material recycling rate data, and energy recovery rate data that is calculated by using a collection information about a quantity of toner collected, an information to be provided to the granulation process about a quality and a quantity of toner that is supplied to the granulation process, an information which is not provided to the granulation process about a quantity and disposal of a toner that is collected but not sent to the granulation process, the information of toner collection, and the information provided to the granulation process, and the information not provided to the granulation process.

38. The toner recycling method according to claim 21, wherein the granules are pillow-shaped with blunt corners, the pillow-shape being a shape having a convex top face and a bottom face with same curvature of top and bottom convex surfaces, and the curvature is less than that of a spherical surface of a sphere.

39. The toner recycling method according to claim 21, wherein the granules formed are substantially cylindrical.

40. The toner recycling system according to claim 37, wherein the granules are manufactured by mixing a toner with at least one of aluminum dregs, mineral based powder particles, and metal based powder particles made from aluminum dross, aluminum ash, and aluminum mineral dregs generated during an aluminum refining process.

41. A toner recycling method comprising:
a toner collection process of collecting toner;
a granulation process of manufacturing granules from the toner;
a receiving process of receiving recycling information about toner required for manufacturing of the granules by a purchaser; and
a toner information management process of managing the recycling information and managing information about the toner collected based on the recycling information, by using a computer.

42. The toner recycling method according to claim 41, wherein the granules are used as a flux for manufacturing steel.

43. The toner recycling method according to claim 41, wherein the granulation process includes mixing the toner with at least one of aluminum dregs, mineral based powder particles, and metal-based powder particles made from aluminum dross, aluminum ash, and aluminum mineral dregs generated during an aluminum refining process.

44. The toner recycling method according to claim 41, wherein the toner collection process includes collecting toner remaining in a used toner receptacle.

45. The toner recycling method according to claim 41, wherein the toner collection process includes collecting non-standardized toner.

46. The toner recycling method according to claim 44, wherein the toner collection process comprises:
a recovery process of recovering a toner containing unit, wherein the toner containing unit is one or more selected from a combination of an image forming apparatus, a built-in unit in an image forming apparatus from which toner can be recovered, and a consumable product; and
a separation process of separating the toner remaining in the toner containing unit.

47. The toner recycling method according to claim 46, wherein the recovery process is carried out in a recovery center and the separation process is carried out in a recycling center.

48. The toner recycling method according to claim 46, wherein the separation process includes separating the toner based on a color of the toner.

49. The toner recycling method according to claim 48, wherein the granulation process includes mixing toners of different colors to manufacture the granules of a specific color.

50. The toner recycling method according to claim 41, wherein the recycling information includes toner acceptance standards for acceptance of toner by the granulation process from the toner collection process, the acceptance standards including at least one standard out of toner color, whether any material is to be mixed with the toner, a material to be mixed, and a toner material.

51. The toner recycling method according to claim 41, wherein the recycling information includes a purchase management information, wherein the purchase management information indicates an amount of toner to be received by the granulation process from the toner collection process and the amount of toner indicated in the purchase management information is provided by the toner collection process to the granulation process.

52. The toner recycling method according to claim 41, wherein in the toner collection process a product code is put on the toner, the toner is provided to the granulation process, and when the toner is provided in units of lots, a manufacturing code is put on each lot in the recycling information.

53. The toner recycling method according to claim 50, wherein the recycling information is transmitted via the Internet between a computer at a site of the granulation process and a computer at a site of the toner collection process.

54. The toner recycling method according to claim 51, wherein the recycling information is transmitted via the Internet between a computer at a site of the granulation process and a computer at a site of the toner collection process.

55. The toner recycling method according to claim 52, wherein the recycling information is transmitted via the Internet between a computer at a site of the granulation process and a computer at a site of the toner collection process.

56. The toner recycling method according to claim 41, further comprising:
a status management process of managing information that includes at least one of a status of toner collection in the toner collection process, a status of providing of toner to the granulation process, and a status of use of the granules provided by the granulation process to a steel manufacturer.

57. The toner recycling method according to claim 56, wherein the status management process includes managing at least one of the data among recycling rate data, material recycling rate data, and energy recovery rate data that is calculated by using a collection information about a quantity of toner collected, an information to be provided to the granulation process about a quality and a quantity of toner that is supplied to the granulation process, an information which is not provided to the granulation process about a quantity and disposal of a toner that is collected but not sent to the granulation process, the information of toner collection, and the information provided to the granulation process, and the information not provided to the granulation process.

58. The toner recycling method according to claim 41, wherein the granules are pillow-shaped with blunt corners, the pillow-shape being a shape having a convex top face and a bottom face with same curvature of top and bottom convex surfaces, and the curvature is less than that of a spherical surface of a sphere.

59. The toner recycling method according to claim 41, wherein the granules formed are substantially cylindrical.

60. The toner recycling system according to claim 57, wherein the granules are manufactured by mixing a toner with at least one of aluminum dregs, mineral based powder particles, and metal based powder particles made from aluminum dross, aluminum ash, and aluminum mineral dregs generated during an aluminum refining process.

61. A toner recycling method comprising:
a toner collection process of collecting toner used in image formation; and
a granulation process of manufacturing granules by mixing the toner with other component, wherein
the granulation process includes mixing the toner with at least one of aluminum dregs, mineral based powder particles, and metal-based powder particles made from aluminum dross, aluminum ash, and aluminum mineral dregs generated during an aluminum refining process.

62. The toner recycling method according to claim 61, wherein the granules are used as a flux for manufacturing steel.

63. The toner recycling method according to claim 61, wherein the toner collection process includes collecting toner remaining in a used toner receptacle.

64. The toner recycling method according to claim 61, wherein the toner collection process includes collecting non-standardized toner.

65. The toner recycling method according to claim 63, wherein the toner collection process comprises:
a recovery process of recovering a toner containing unit, wherein the toner containing unit is one or more selected from a combination of an image forming apparatus, a built-in unit in an image forming apparatus from which toner can be recovered, and a consumable product; and
a separation process of separating the toner remaining in the toner containing unit.

66. The toner recycling method according to claim 65, wherein the recovery process is carried out in a recovery center and the separation process is carried out in a recycling center.

67. The toner recycling method according to claim 65, wherein the separation process includes separating the toner based on a color of the toner.

68. The toner recycling method according to claim 67, wherein in the granulation process includes mixing toners of different colors to manufacture granules of a specific color.

69. The toner recycling method according to claim 61, wherein
the granulation process includes sending recycling information to the toner collection process by using a communication device, and
the toner collection process includes receiving the recycling information by using a communication device and providing appropriate toner to the granulation process based on the recycling information.

70. The toner recycling method according to claim 69, wherein the recycling information includes toner acceptance standards for acceptance of toner by the granulation process from the toner collection process, the acceptance standards including at least one standard out of toner color, whether any material is to be mixed with the toner, a material to be mixed, and a toner material.

71. The toner recycling method according to claim 66, wherein recycling information sent by the granulation process to the toner collection process includes a purchase management information, wherein the purchase management information indicates an amount of toner to be received by the granulation process from the toner collection process and the amount of toner indicated in the purchase management information is provided by the toner collection process to the granulation process.

72. The toner recycling method according to claim 67, wherein recycling information sent by the granulation process to the toner collection process includes a purchase management information, wherein the purchase management information indicates an amount of toner to be received by the granulation process from the toner collection process and the amount quantity of toner indicated in the purchase management information is provided by the toner collection process to the granulation process.

73. The toner recycling method according to claim 66, wherein in the toner collection process a product code is put on the toner, the toner is provided to the granulation process and when the toner is provided in units of lots, a manufacturing code is put on each lot in the recycling information.

74. The toner recycling method according to claim 67, wherein in the toner collection process a product code is put on the toner, the toner is provided to the granulation process and when the toner is provided in units of lots, a manufacturing code is put on each lot in the recycling information.

75. The toner recycling method according to claim 69, wherein the communication device is a computer and the recycling information is transmitted via the Internet between a computer at a site of the granulation process and a computer at a site of the toner collection process.

76. The toner recycling method according to claim 70, wherein the communication device is a computer and the recycling information is transmitted via the Internet between a computer at a site of the granulation process and a computer at a site of the toner collection process.

77. The toner recycling method according to claim 71, wherein recycling information is transmitted via the Internet between a computer at a site of the granulation process and a computer at a site of the toner collection process.

78. The toner recycling method according to claim 72, wherein the recycling information is transmitted via the Internet between a computer at a site of the granulation process and a computer at a site of the toner collection process.

79. The toner recycling method according to claim 61, further comprising:
a status management process of managing information that includes at least one of a status of toner collection in the toner collection process, a status of providing of toner to the granulation process, and status of use of the granules provided by the granulation process to a steel manufacturer.

80. The toner recycling method according to claim 79, wherein the status management process includes managing at least one of the data among recycling rate data, material recycling rate data, and energy recovery rate data that is calculated by using a collection information about a quantity of toner collected, an information to be provided to the granulation process about a quality and a quantity of toner that is supplied to the granulation process, an information which is not provided to the granulation process about a quantity and disposal of a toner that is collected but not sent to the granulation process, the information of toner collection, and the information provided to the granulation process, and the information not provided to the granulation process.

81. The toner recycling method according to claim 61, wherein the granules are pillow-shaped with blunt corners, the pillow-shape being a shape having a convex top face and a bottom face with same curvature of top and bottom convex surfaces, and the curvature is less than that of a spherical surface of a sphere.

82. The toner recycling method according to claim 61, wherein the granules formed are substantially cylindrical.

83. A toner recycling method comprising:
a toner collection process of collecting toner used in image formation and providing the toner to a granulation process of manufacturing granules, and
a separation process that includes separating the toner based on a color of the toner.

84. The toner recycling method according to claim 83, wherein the granules are used as a flux for manufacturing steel.

85. The toner recycling method according to claim 83, wherein the granulation process includes mixing the toner with at least one of aluminum dregs, mineral based powder particles, and metal-based powder particles made from aluminum dross, aluminum ash, and aluminum mineral dregs generated during an aluminum refining process.

86. The toner recycling method according to claim 83, wherein the toner collection process includes collecting toner remaining in a used toner receptacle.

87. The toner recycling method according to claim 83, wherein the toner collection process includes collecting non-standardized toner.

88. The toner recycling method according to claim 86, wherein the toner collection process comprises:
a recovery process of recovering a toner containing unit, wherein the toner containing unit is one or more selected from a combination of an image forming apparatus, a built-in unit in an image forming apparatus from which toner can be recovered, and a consumable product; and
a separation process of separating the toner remaining in the toner containing unit.

89. The toner recycling method according to claim 88, wherein the recovery process is carried out in a recovery center and the separation process is carried out in a recycling center.

90. The toner recycling method according to claim 83, wherein the granulation process includes mixing toners of different colors to manufacture granules of a specific color.

91. The toner recycling method according to claim 83, wherein
the granulation process includes sending recycling information to the toner collection process by using a communication device, and
the toner collection process includes receiving the recycling information by using a communication device and providing appropriate toner to the granulation process based on the recycling information.

92. The toner recycling method according to claim 91, wherein the recycling information includes toner acceptance standards for acceptance of toner by the granulation process from the toner collection process, the acceptance standards including at least one standard out of toner color, whether any material is to be mixed with the toner, a material to be mixed, and a toner material.

93. The toner recycling method according to claim 89, wherein recycling information sent by the granulation process to the toner collection process includes a purchase management information, wherein the purchase management information indicates an amount of toner to be received by the granulation process from the toner collection process and the amount of toner indicated in the purchase management information is provided by the toner collection process to the granulation process.

94. The toner recycling method according to claim 83, wherein recycling information sent by the granulation process to the toner collection process includes a purchase management information, wherein the purchase management information indicates an amount of toner to be received by the granulation process from the toner collection process and the amount of toner indicated in the purchase management information is provided by the toner collection process to the granulation process.

95. The toner recycling method according to claim 89, wherein in the toner collection process a product code is put on the toner, the toner is provided to the granulation process and when the toner is provided in units of lots, a manufacturing code is put on each lot in the recycling information.

96. The toner recycling method according to claim 83, wherein in the toner collection process a product code is put on the toner, the toner is provided to the granulation process and when the toner is provided in units of lots, a manufacturing code is put on each lot in the recycling information.

97. The toner recycling method according to claim 91, wherein the communication device is a computer and the recycling information is transmitted via the Internet between a computer at a site of the granulation process and a computer at a site of the toner collection process.

98. The toner recycling method according to claim 92, wherein the communication device is a computer and the recycling information is transmitted via the Internet between a computer at a site of the granulation process and a computer at a site of the toner collection process.

99. The toner recycling method according to claim 93, wherein the recycling information is transmitted via the Internet between a computer at a site of the granulation process and a computer at a site of the toner collection process.

100. The toner recycling method according to claim 94, wherein the recycling information is transmitted via the Internet between a computer at a site of the granulation process and a computer at a site of the toner collection process.

101. The toner recycling method according to claim 83, further comprising:
a status management process of managing information that includes at least one of a status of toner collection in the toner collection process, a status of providing of toner to the granulation process, and status of use of the granules provided by the granulation process to a steel manufacturer.

102. The toner recycling method according to claim 101, wherein the status management process includes managing at least one of the data among recycling rate data, material recycling rate data, and energy recovery rate data that is calculated by using a collection information about a quantity of toner collected, an information to be provided to the granulation process about a quality and a quantity of toner that is supplied to the granulation process, an information which is not provided to the granulation process about a quantity and disposal of a toner that is collected but not sent to the granulation process, the information of toner collection, and the information provided to the granulation process, and the information not provided to the granulation process.

103. The toner recycling method according to claim 83, wherein the granules are pillow-shaped with blunt corners, the pillow-shape being a shape having a convex top face and a bottom face with same curvature of top and bottom convex surfaces, and the curvature is less than that of a spherical surface of a sphere.

104. The toner recycling method according to claim 83, wherein the granules formed are substantially cylindrical.

105. The toner recycling system according to claim 102, wherein the granules are manufactured by mixing a toner with at least one of aluminum dregs, mineral based powder particles, and metal based powder particles made from aluminum dross, aluminum ash, and aluminum mineral dregs generated during an aluminum refining process.

106. A toner recycling method comprising:
a granulation process of manufacturing granules by mixing toner used in image formation with other component, and
a status management process of managing information that includes at least of one of a status of toner collection in a toner collection process, a status of providing of toner to the granulation process, and a status of use of granules provided by the granulation process to a steel manufacturer.

107. The toner recycling method according to claim 106, wherein the granules are used as a flux for manufacturing steel.

108. The toner recycling method according to claim 106, wherein the granulation process includes mixing the toner with at least one of aluminum dregs, mineral based powder particles, and metal-based powder particles made from aluminum dross, aluminum ash, and aluminum mineral dregs generated during an aluminum refining process.

109. The toner recycling method according to claim 106, wherein the toner collection process includes collecting toner remaining in a used toner receptacle.

110. The toner recycling method according to claim 106, wherein the toner collection process includes collecting non-standardized toner.

111. The toner recycling method according to claim 109, wherein the toner collection process comprises:
a recovery process of recovering a toner containing unit, wherein the toner containing unit is one or more selected from a combination of an image forming apparatus, a built-in unit in an image forming apparatus from which toner can be recovered, and a consumable product; and
a separation process of separating the toner remaining in the toner containing unit.

112. The toner recycling method according to claim 111, wherein the recovery process is carried out in a recovery center and the separation process is carried out in a recycling center.

113. The toner recycling method according to claim 106, further comprising separation process that includes separating the toner based on a color of the toner.

114. The toner recycling method according to claim 113, wherein the granulation process includes mixing toners of different colors to manufacture the granules of a specific color.

115. The toner recycling method according to claim 106, wherein
the granulation process includes sending recycling information to the toner collection process by using a communication device, and
the toner collection process includes receiving the recycling information by using a communication device and providing appropriate toner to the granulation process based on the recycling information.

116. The toner recycling method according to claim 115, wherein the recycling information includes toner acceptance standards for acceptance of toner by the granulation process from the toner collection process, the acceptance standards including at least one standard out of toner color, whether any material is to be mixed with the toner, a material to be mixed, and a toner material.

117. The toner recycling method according to claim 112, wherein recycling information sent by the granulation process to the toner collection process includes a purchase management information, wherein the purchase management information indicates an amount of toner to be received by the granulation process from the toner collection process and the amount of toner indicated in the purchase management information is provided by the toner collection process to the granulation process.

118. The toner recycling method according to claim 113, wherein recycling information sent by the granulation process to the toner collection process includes a purchase management information, wherein the purchase management information indicates an amount of toner to be received by the granulation process from the toner collection process and the amount of toner indicated in the purchase management information is provided by the toner collection process to the granulation process.

119. The toner recycling method according to claim 112, wherein in the toner collection process a product code is put on the toner, the toner is provided to the granulation process and when the toner is provided in units of lots, a manufacturing code is put on each lot in the recycling information.

120. The toner recycling method according to claim 113, wherein in the toner collection process a product code is put on the toner, the toner is provided to the granulation process, and when the toner is provided in units of lots, a manufacturing code is put on each lot in the recycling information.

121. The toner recycling method according to claim 115, wherein the communication device is a computer and the recycling information is transmitted via the Internet between a computer at a site of the granulation process and a computer at a site of the toner collection process.

122. The toner recycling method according to claim 116, wherein the communication device is a computer and the recycling information is transmitted via the Internet between a computer at a site of the granulation process and a computer at a site of the toner collection process.

123. The toner recycling method according to claim 117, wherein the recycling information is transmitted via the Internet between a computer at a site of the granulation process and a computer at a site of the toner collection process.

124. The toner recycling method according to claim 118, wherein the recycling information is transmitted via the Internet between a computer at a site of the granulation process and a computer at a site of the toner collection process.

125. The toner recycling method according to claim 106, wherein the status management process includes managing at least one of the data among recycling rate data, material recycling rate data, and energy recovery rate data that is calculated by using a collection information about a quantity of toner collected, an information to be provided to the granulation process about a quality and a quantity of toner that is supplied to the granulation process, an information which is not provided to the granulation process about a quantity and disposal of a toner that is collected but not sent to the granulation process, the information of toner collection, and the information provided to the granulation process, and the information not provided to the granulation process.

126. The toner recycling method according to claim 106, wherein the granules are pillow-shaped with blunt corners, the pillow-shape being a shape having a convex top face and a bottom face with same curvature of top and bottom convex surfaces, and the curvature is less than that of a spherical surface of a sphere.

127. The toner recycling method according to claim 106, wherein the granules formed are substantially cylindrical.

128. The toner recycling system according to claim 125, wherein the granules are manufactured by mixing a toner with at least one of aluminum dregs, mineral based powder particles, and metal based powder particles made from aluminum dross, aluminum ash, and aluminum mineral dregs generated during an aluminum refining process.

129. A toner recycling system comprising:
a collection information management unit that manages information about a toner collected at a toner collection site;
a recycling information generation unit that generates recycling information, wherein the recycling information includes information about a requirement of toner in a granulation site; and
a display unit installed at the toner collection site and that displays the recycling information.

130. The toner recycling system according to claim 129, wherein granules from the granulation site are used as a flux for manufacturing steel.

131. The toner recycling system according to claim 129, wherein granules are manufactured at the granulation site by mixing a toner with at least one of aluminum dregs, mineral based powder particles, and metal based powder particles made from aluminum dross, aluminum ash, and aluminum mineral dregs generated during an aluminum refining process.

132. The toner recycling system according to claim 129, wherein the toner collection site includes a toner manufacturing factory where the toner is manufactured, a shop where the manufactured toner is sold, a recovery center where the sold toner is recovered, and a recycling center where the recovered toner is separated.

133. The toner recycling system according to claim 129, wherein the toner collection site includes a toner manufacturing factory where the toner is manufactured, a manufacturing factory where an image forming apparatus and a peripheral equipment are manufactured and the manufactured toner is used in the image forming apparatus and the peripheral equipment, a recovery center where the toner used in the image forming device and the peripheral equipment is recovered, and a recycling center where the recovered toner is separated.

134. The toner recycling system according to claim 129, wherein the recycling information is generated based on conditions demanded by a prospective purchaser of granules.

135. The toner recycling system according to claim 129, wherein the recycling information includes toner acceptance standards for acceptance of toner at the granulation site, the acceptance standards including has at least one standard out of toner color, whether any material is to be mixed with the toner, a material to be mixed, and a toner material.

136. The toner recycling system according to claim 129, wherein the recycling information includes a purchase management information, wherein the purchase management information indicates a quantity of toner accepted by the granulation site from the toner collection site.

137. The toner recycling system according to claim 129, wherein the recycling information includes a toner product code and a manufacturing code of each lot, when the toner is supplied to a granule manufacturer in units of lots.

138. The toner recycling system according to claim 129, wherein the recycling information is transmitted via the Internet between information processing units kept at the toner collection site and the granulation site.

139. The toner recycling system according to claim 129, further comprising:
a status management unit that manages information that includes at least one of the status of status of toner collection, a status of providing of toner to the granulation site of toner, and status of use of granules supplied from the granulation site to a steel manufacturer.

140. The toner recycling system according to claim 139, wherein the status management unit manages at least one of the data among recycling rate data, material recycling rate data, and energy recovery rate data that is calculated by using a collection information about a quantity of toner collected, an information to be provided to the granulation process about a quantity of toner that is supplied to the granulation site, an information which is not provided to the granulation site about a quantity and disposal of a toner that is collected but not sent to the granulation site, the information of toner collection, the information provided to the granulation site, and the information not provided to the granulation site.

141. The toner recycling system according to claim 129, wherein the toner collection information management unit manages information for each toner having a different color.

* * * * *